(12) United States Patent
Oh

(10) Patent No.: US 11,932,244 B2
(45) Date of Patent: Mar. 19, 2024

(54) APPARATUS AND METHOD FOR CONTROLLING AUTONOMOUS DRIVING OF VEHICLE

(71) Applicants: HYUNDAI MOTOR COMPANY, Seoul (KR); KIA CORPORATION, Seoul (KR)

(72) Inventor: Tae Dong Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 189 days.

(21) Appl. No.: 17/475,778

(22) Filed: Sep. 15, 2021

(65) Prior Publication Data

US 2022/0089152 A1 Mar. 24, 2022

(30) Foreign Application Priority Data

Sep. 21, 2020 (KR) ........................ 10-2020-0121593

(51) Int. Cl.
*B60W 30/00* (2006.01)
*B60W 30/095* (2012.01)
(Continued)

(52) U.S. Cl.
CPC ........ *B60W 30/0956* (2013.01); *B60W 40/04* (2013.01); *B60W 40/076* (2013.01);
(Continued)

(58) Field of Classification Search
CPC ............. B60W 30/0956; B60W 40/04; B60W 40/076; B60W 60/0011; B60W 60/0015;
(Continued)

(56) References Cited

U.S. PATENT DOCUMENTS 9,786,177 B2 10/2017 Ayvaci et al.
10,223,919 B2 3/2019 Bai et al.
(Continued)

FOREIGN PATENT DOCUMENTS

| CN | 111459168 B | * 12/2021 | ........... G05D 1/0223 |
| EP | 3706034 A1 | * 9/2020 | ........ B60W 30/0956 |

(Continued)

*Primary Examiner* — Peter D Nolan
*Assistant Examiner* — Peter Y Ning
(74) *Attorney, Agent, or Firm* — Morgan, Lewis & Bockius LLP

(57) ABSTRACT

An apparatus and method are provided for controlling autonomous driving of a vehicle which may derive predicted paths of a pedestrian and a two-wheel vehicle during autonomous driving of the vehicle so as to minimize accidents. The method includes calculating first height information allocating a first gradient that descends in a proceeding direction of objects, including a vehicle and a pedestrian, from respective positions of the objects based on dynamic information of the objects, calculating second height information allocating a second gradient based on a probability that the pedestrian will occupy infrastructure, calculating final height information by fusing the first height information and the second height information, generating a predicted path of the pedestrian, determining a driving strategy of a host vehicle based on a predicted path of the host vehicle and the predicted path of the pedestrian.

19 Claims, 29 Drawing Sheets

(51) Int. Cl.
  *B60W 40/04* (2006.01)
  *B60W 40/076* (2012.01)
  *B60W 60/00* (2020.01)
(52) U.S. Cl.
  CPC .... *B60W 60/0011* (2020.02); *B60W 60/0015* (2020.02); *B60W 60/00274* (2020.02); *B60W 2552/15* (2020.02); *B60W 2554/4029* (2020.02); *B60W 2554/80* (2020.02); *B60W 2556/35* (2020.02); *B60W 2556/40* (2020.02)
(58) Field of Classification Search
  CPC ....... B60W 60/00274; B60W 2552/15; B60W 2554/4029; B60W 2554/80; B60W 2556/35; B60W 2556/40; B60W 30/095; B60W 30/18163; B60W 2552/53; B60W 2554/4026; B60W 2555/60; B60W 2720/103; B60W 60/0016; B60W 60/0017; B60W 60/0027; B60W 60/001; B60W 40/105; B60W 40/107; B60R 21/34; G05D 1/0055; G05D 1/0212; G05D 2201/0213; B60Y 2300/095; B60Y 2300/18166
  See application file for complete search history.

(56) References Cited

U.S. PATENT DOCUMENTS

| | | | |
|---|---|---|---|
| 10,636,295 B1 * | 4/2020 | Kim | G06V 10/764 |
| 11,447,129 B2 * | 9/2022 | Mangalam | G08G 1/166 |
| 11,520,346 B2 * | 12/2022 | Anthony | B60W 30/09 |
| 11,521,396 B1 * | 12/2022 | Jain | G06N 3/0455 |
| 11,572,083 B2 * | 2/2023 | Maat | G06N 3/044 |
| 2016/0300485 A1 * | 10/2016 | Ayvaci | G06V 20/58 |
| 2018/0330618 A1 * | 11/2018 | Bai | G08G 1/161 |
| 2019/0147372 A1 * | 5/2019 | Luo | G06N 20/00 706/20 |
| 2020/0023842 A1 * | 1/2020 | Gutierrez | G06V 20/584 |
| 2020/0082248 A1 * | 3/2020 | Villegas | G06N 3/044 |
| 2020/0293064 A1 * | 9/2020 | Wu | G06F 18/214 |
| 2021/0103742 A1 * | 4/2021 | Adeli-Mosabbeb | G06V 40/10 |
| 2021/0150752 A1 * | 5/2021 | Ayvaci | G06V 20/58 |
| 2021/0179097 A1 * | 6/2021 | Pan | G06V 10/44 |
| 2021/0188263 A1 * | 6/2021 | Zhu | B60W 60/0027 |
| 2021/0201052 A1 * | 7/2021 | Ranga | G06T 7/11 |
| 2021/0201504 A1 * | 7/2021 | Xu | G06N 3/08 |
| 2022/0012988 A1 * | 1/2022 | Avadhanam | G08G 1/166 |

FOREIGN PATENT DOCUMENTS

| | | | | |
|---|---|---|---|---|
| JP | 2016-191593 A | | 11/2016 | |
| JP | 2016191593 A | * | 11/2016 | |
| JP | 2019-204509 A | | 11/2019 | |
| KR | 10-2018-0047149 A | | 5/2018 | |
| KR | 20180047149 A | * | 5/2018 | |
| WO | WO-2020205655 A1 | * | 10/2020 | ......... B60W 30/182 |
| WO | WO-2020245654 A1 | * | 12/2020 | ....... B60W 30/0953 |
| WO | WO-2021020311 A1 | * | 2/2021 | ............ B60W 10/04 |
| WO | WO-2021070451 A1 | * | 4/2021 | ............ B60W 10/20 |

* cited by examiner (a)

(b)

(a)

(b)

<CASE 1: VEHICLE SLOWLY APPROACHING FROM SHORT DISTANCE>

<CASE 2: VEHICLE RAPIDLY APPROACHING FROM LONG DISTANCE>

<CASE 3: VEHICLE SLOWLY APPROACHING FROM LONG DISTANCE>

<CASE 4: VEHICLE RAPIDLY APPROACHING FROM SHORT DISTANCE>

<FINAL HEIGHT DETERMINATION AT INTERSECTION>

<METHOD FOR SELECTING PEDESTRIAN OF INTEREST>

3.1 SECS
5.4 SECS

<DETERMINATION OF RISK BASED ON TIME TO COLLISION ON PREDICTED PATH>

<PHOTOGRAPH OF BLIND SPOT MINIMIZED USING 3D ROOF LIDAR>

<OCCLUSION MINIMIZED USING 3D ROOF LIDAR>

APPARATUS AND METHOD FOR CONTROLLING AUTONOMOUS DRIVING OF VEHICLE

This application claims the benefit of priority to Korean Patent Application No. 10-2020-0121593, filed on Sep. 21, 2020, which is hereby incorporated by reference as if fully set forth herein.

TECHNICAL FIELD

The present disclosure relates to an apparatus and method for controlling autonomous driving of a vehicle which may derive predicted paths of a pedestrian and a two-wheel vehicle during autonomous driving of the vehicle so as to minimize accidents.

BACKGROUND

In general, an autonomous vehicle autonomously detects roads and circumstances thereof without operating an accelerator pedal, a steering wheel, a brake, etc. by a driver, and may thus travel to a destination.

The autonomous vehicle must control a driving path thereof in consideration of movement not only of other vehicles driving on roads but also of pedestrians and two-wheel vehicles crossing roads. The conventional autonomous vehicle predicts the next position of a pedestrian using the current position of the pedestrian and dynamic information thereabout based on a mathematical probability distribution model in which movement of pedestrians and two-wheel vehicles in all directions is considered.

However, because the long-term and short-term movement characteristics of the pedestrians are not considered when a road is congested in a traffic jam, the conventional autonomous vehicle may have problems, such as frequent occurrence of erroneous warning and non-warning.

The information disclosed in the Background section above is to aid in the understanding of the background of the present disclosure, and should not be taken as acknowledgement that this information forms any part of prior art.

SUMMARY

Accordingly, the present disclosure is directed to an apparatus and method for controlling autonomous driving of a vehicle that substantially obviate one or more problems due to limitations and disadvantages of the related art.

An objective of the present disclosure is to provide an apparatus and method for controlling autonomous driving of a vehicle which may accurately derive the predicted path of a pedestrian so as to minimize pedestrian accidents and to secure driving stability of an autonomous vehicle.

Another objective of the present disclosure is to provide an apparatus and method for controlling autonomous driving of a vehicle which may be applied not only to the simple movement of a pedestrian but also to a model about interaction with the vehicle and effectively derive the predicted path of the pedestrian in a jaywalking situation on a general road as well as in an area having a crosswalk.

Additional advantages, objectives, and features of the present disclosure will be set forth in part in the description which follows and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objectives and other advantages and in accordance with the purpose of the disclosure, as embodied and broadly described herein, a method for controlling autonomous driving of a vehicle includes calculating first height information allocating a first gradient that descends in a proceeding direction of objects, including a vehicle and a pedestrian, from respective positions of the objects based on dynamic information of the objects, calculating second height information allocating a second gradient based on a probability that the pedestrian will occupy infrastructure other than the objects, calculating final height information by fusing the first height information and the second height information, generating a predicted path of the pedestrian based on the final height information and modeling information of a crossing path and speed of the pedestrian, and determining a driving strategy of a host vehicle based on a predicted path of the host vehicle and the predicted path of the pedestrian.

In another aspect of the present disclosure, an apparatus for controlling autonomous driving of a vehicle includes a processor which is configured to calculate first height information allocating a first gradient that descends in a proceeding direction of objects, including a vehicle and a pedestrian, from respective positions of the objects based on dynamic information of the objects, to calculate second height information allocating a second gradient based on a probability that the pedestrian will occupy infrastructure other than the objects, to calculate final height information by fusing the first height information and the second height information, to generate a predicted path of the pedestrian based on the final height information and modeling information of a crossing path and speed of the pedestrian, and to determine a driving strategy of a host vehicle based on a predicted path of the host vehicle and the predicted path of the pedestrian.

It is to be understood that both the foregoing general description and the following detailed description of the present disclosure are exemplary and explanatory and are intended to provide further explanation of the inventive concept(s) as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the disclosure. In the drawings.

DETAILED DESCRIPTION

Figure 1:
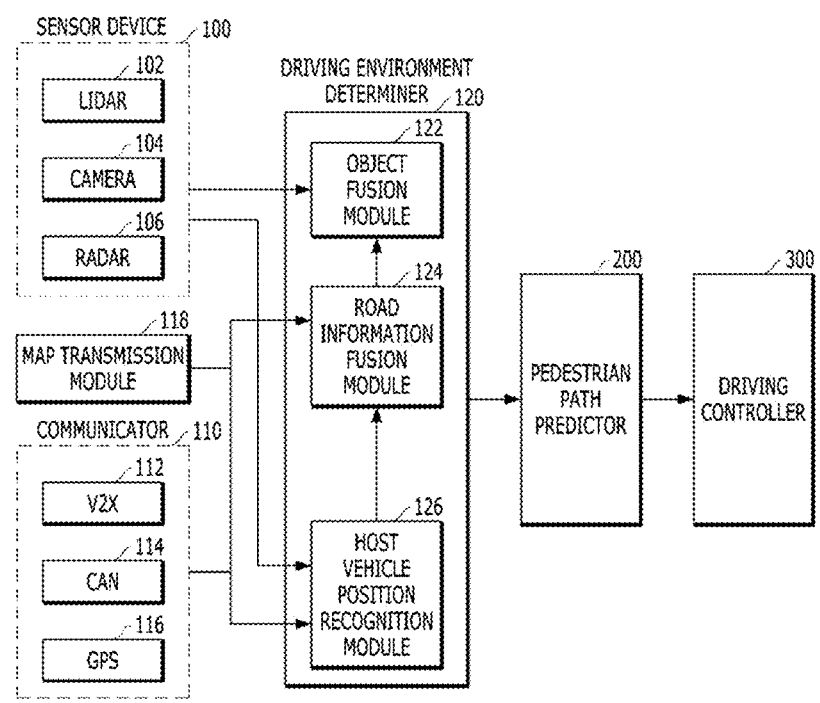
FIG. 1 is a schematic block diagram of an apparatus for controlling autonomous driving of a vehicle according to one embodiment of the present disclosure.

Reference will now be made in detail to preferred embodiments of the present disclosure, examples of which are illustrated in the accompanying drawings. However, the disclosure of the inventive concept(s) is not limited to the embodiments set forth herein and may be variously modified. In the drawings, in order to clearly describe the present disclosure, descriptions of elements which are not related to the present disclosure are omitted, and the same or similar elements are denoted by the same reference numerals even when they are depicted in different drawings.

In the following description of the embodiments, it will be understood that, when a part "includes" an element, the part may further include other elements, and does not exclude the presence of such other elements, unless stated otherwise. Further, in the following description of the embodiments, parts denoted by the same reference numerals indicate the same elements.

An apparatus for controlling autonomous driving of a vehicle according to the present disclosure derives a predicted path of a pedestrian in consideration of a tendency that pedestrians and two-wheel vehicles pass in front of a decelerated or stopped vehicle rather than an accelerating vehicle and occupy a space as there is no vehicle therebehind or as a vehicle therebehind is not accelerating. For this purpose, the apparatus builds a grid map using a velocity vector in a spatial domain, performs matrix conversion of the grid map, and extracts the predicted path of the pedestrian based on Gradient Descent and a Long Short-Term Memory of deep learning. Therefore, the apparatus may improve accuracy of path prediction of a pedestrian and a two-wheel vehicle.

Hereinafter, an apparatus for controlling autonomous driving of a vehicle according to each embodiment of the present disclosure will be described with reference to the accompanying drawings. First, an element referred to as a pedestrian may be replaced by other elements including an element referred to as a two-wheel vehicle which runs on a sidewalk and crosses a road.

FIG. 1 is a schematic block diagram of an apparatus for controlling autonomous driving of a vehicle according to one embodiment of the present disclosure.

Referring to FIG. 1, the apparatus according to one embodiment of the present disclosure includes a sensor device 100, a communicator 110, a map transmission module 118, a driving environment determiner 120, a pedestrian path predictor 200 and a driving controller 300.

The sensor device 100 may sense at least one peripheral vehicle located in front of, beside and/or behind a host vehicle, and may detect the position, speed and acceleration of each peripheral vehicle. The sensor device 100 may include various sensors, such as a lidar 102, a camera 104, a radar 106, etc., which are installed at the front, side and rear parts of the host vehicle.

The lidar 102 may measure a distance between the host vehicle and the peripheral vehicle. The lidar 102 may measure the distance from the peripheral vehicle and the shape of the peripheral vehicle by calculating spatial position coordinates of a reflection point by radiating a laser pulse to the peripheral vehicle and measuring the arrival time of the laser pulse reflected by the peripheral vehicle.

The camera 104 may acquire an image on the periphery of the host vehicle through an image sensor. The camera 104 may include an image processor which performs processing of the acquired image, such as noise removal, image quality and saturation control, and file compression.

The radar 106 may measure the distance between the host vehicle and the peripheral vehicle. The lidar 102 may measure the distance from the peripheral vehicle, the direction and height of the peripheral vehicle, etc. by radiating electromagnetic waves to the peripheral vehicle and receiving electromagnetic waves reflected by the peripheral vehicle.

The communicator 110 may receive information for sensing the positions of the host vehicle and other vehicles. The communicator 110 may include various apparatuses configured to receive information for sensing the position of the host vehicle, i.e., a vehicle to everything (V2X) communication apparatus 112, a controller area network (CAN) 114, a global positioning system (GPS) 116, etc.

The map transmission module 118 provides a precise map in which lanes are discriminable. The precise map may be stored in the form of a database (DB), may be automatically updated on a regular cycle using wireless communication or manually updated by a user, and may include information about merging sections of lanes (for example, including position information on the merging sections and legal speed limit position of the merging sections), road information depending on position, information about road branches, information about intersections, etc.

The driving environment determiner 120 may fuse object information about the host vehicle and the other vehicles on the precise map based on the information acquired by the sensor device 10, the map transmission module 118 and the communicator 110, and may then output the fused object information. The driving environment determiner 120 of the apparatus according to an exemplary embodiment of the present disclosure may be a processor. The processor 120 has an associated non-transitory memory storing software instructions which, when executed by the processor 120, provides the functionalities of an object fusion module 122, a road information fusion module 124 and a host vehicle position recognition module 126. The processor 120 may take the form of one or more processor(s) and associated memory storing program instructions.

The host vehicle position recognition module 126 outputs precise position information about the host vehicle. The host vehicle position recognition module 126 may compare the information sensed by the sensor device 100, GPS information on the host vehicle collected by the communicator 110, and precise map information provided by the map transmission module 118 with each other, and may thus output the position information and position recognition reliability information on the host vehicle together.

The road information fusion module 124 outputs the precise map on the periphery of the host vehicle. The road information fusion module 124 outputs precise map information on the periphery of the host vehicle to the object fusion module 122 and the pedestrian path predictor 200 based on the position recognition reliability information and the precise map information.

The object fusion module 122 outputs fused object information to the pedestrian path predictor 200. The object fusion module 122 receives information about vehicles located inside a road or located in other areas beside the road, the positions, speeds and classification information of pedestrians, and contour and box information in a fused state from the sensor device 100. The object fusion module 122 fuses the object information input from the sensor device 100 onto the precise map information on the periphery of the host vehicle, and then outputs the fused object information.

The pedestrian path predictor 200 calculates final height information by extracting height information from the fused object information input from the object fusion module 122 and height information from the precise map information on the periphery of the host vehicle input from the road information fusion module 124, and outputs the predicted path of the pedestrian based on the final height information.

The driving controller 300 may determine the driving path of the host vehicle based on the predicted pedestrian path output by the pedestrian path predictor 200, and may thus control the driving state of the host vehicle. The pedestrian path predictor 200 and the driving controller 300 may have configurations shown in FIGS. 2 and 3.

Figure 2:
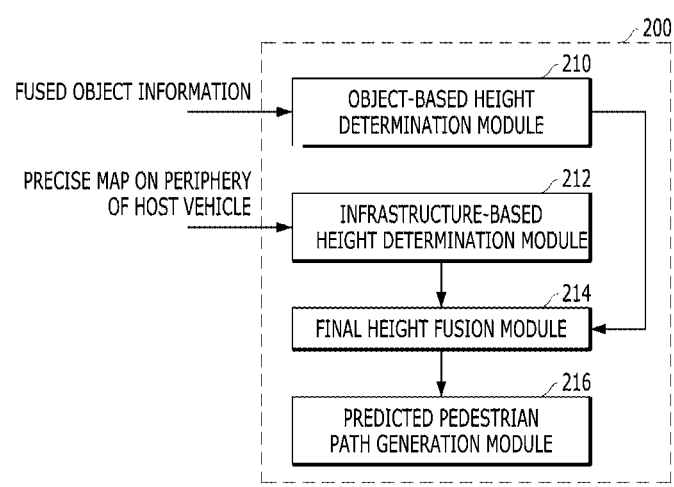
FIG. 2 is a schematic block diagram illustrating one example of the configuration of a pedestrian path predictor of FIG. 1.

FIG. 2 is a schematic block diagram illustrating one example of the configuration of the pedestrian path predictor 200 of FIG. 1. The pedestrian path predictor 200 extracts height information about objects and height information about infrastructure other than the objects from the fused object information, road information and the precise map information on the periphery of the host vehicle, and predicts the path of the pedestrian based on the extracted height information.

Referring to FIG. 2, the pedestrian path predictor 200 of the apparatus according to an exemplary embodiment of the present disclosure may be a processor. The processor 200 has an associated non-transitory memory storing software instructions which, when executed by the processor 200, provides the functionalities of an object-based height determination module (or a first height determination module) 210, an infrastructure-based height determination module (or a second height determination module) 212, a final height fusion module 214 and a predicted pedestrian path generation module 216. The processor 200 may take the form of one or more processor(s) and associated memory storing program instructions.

The object-based height determination module 210 calculates object-based height information by analyzing the precise map-fused object information input from the object fusion module 122. The object-based height determination module 210 may calculate height information for allocating a gradient to areas occupied by the objects and the moving directions of the objects depending on types, speeds and positions of the objects and shape information thereabout included in the fused object information.

The infrastructure-based height determination module 212 calculates infrastructure-based height information from the precise map on the periphery of the host vehicle input from the road information fusion module 124. The infrastructure-based height determination module 212 may calculate height information for allocating a gradient using infrastructure, such as road shapes, traffic signal information, crosswalk information, etc., other than the objects.

The final height fusion module 214 receives the object-based height information output from the object-based height determination module 210 and the infrastructure-based height information output from the infrastructure-based height determination module 212. The final height fusion module 214 calculates final heights by combining the object-based height information and the infrastructure-based height information. The final height fusion module 214 may output the calculated final heights in the form of a matrix.

The predicted pedestrian path generation module 216 predicts the path of the pedestrian based on the height matrix output from the final height fusion module 214. The predicted pedestrian path generation module 216 may predict the path of the pedestrian through Gradient Descent or a machine learning technique using the height information, output as the height matrix, as gradient information. The predicted pedestrian path generation module 216 may predict the path of the pedestrian by outputting a frame having the predicted position of the pedestrian as a future sequence every hour by synchronizing with the operating cycles of the sensors and logic.

Figure 3:
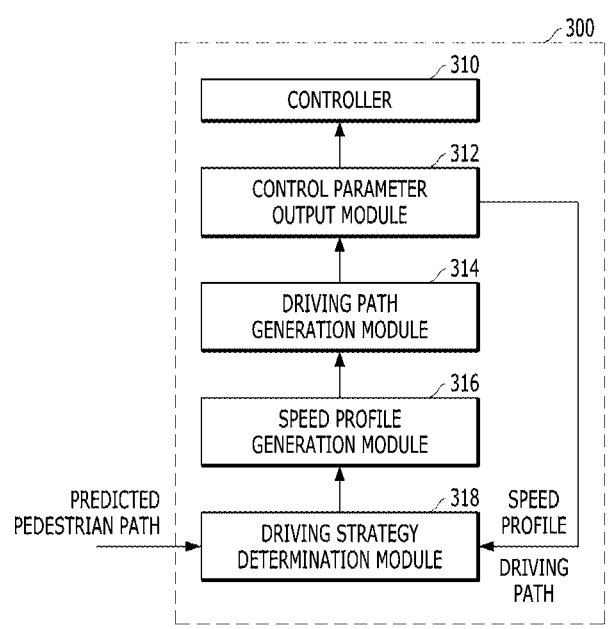
FIG. 3 is a schematic block diagram illustrating one example of the configuration of a driving controller of FIG. 1.

FIG. 3 is a schematic block diagram illustrating one example of the configuration of the driving controller 300 of FIG. 1.

The driving controller 300 may control autonomous driving of the host vehicle based on the target lanes of other vehicles, i.e., the driving intentions of the other vehicle, determined by the pedestrian path predictor 200.

Referring to FIG. 3, the driving controller 300 may perform various functions of a driving strategy determination module 318, a speed profile generation module 316, a driving path generation module 314, a control parameter output module 312, and a controller 310.

The driving controller 300 of the apparatus according to an exemplary embodiment of the present disclosure may be a processor (e.g., computer, microprocessor, CPU, ASIC, circuitry, logic circuits, etc.). The driving controller 300 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The driving strategy determination module 318 determines a driving strategy based on the predicted pedestrian path input from the predicted pedestrian path generation module 216 and a driving path and a speed profile in a previous time frame input from the control parameter output module 312. The driving strategy determination module 318 may determine a risk of collision between the predicted path of the host vehicle and the predicted path of the pedestrian on the driving path of the host vehicle using the path of the host vehicle in the previous time frame as input, and may thus determine a final driving strategy in which the host vehicle does not drive at the travel position of the pedestrian at a corresponding point in time through time information about the pedestrian in a row A on the driving path of the host vehicle.

The speed profile generation module 316 may generate a speed profile corresponding to the final driving strategy based on the precise map information including information about speed limits and speed bumps, the final driving strategy, the predicted pedestrian path and the fused object information. The speed profile generation module 316 generates the speed profile preventing the host vehicle from driving at the travel position of the pedestrian at a corresponding point in time through information about the speed of a vehicle nearest to the driving path of the host vehicle, speed limits, front speed bumps, and the travel time information about the pedestrian on the driving path of the host vehicle, on the assumption of the point-level path (PL) in the previous time frame.

The driving path generation module 314 may calculate a driving path, which bypasses an area occupied by the pedestrian according to time, with reference to the speed profile. Here, determination as to whether or not the host vehicle bypasses the area occupied by the pedestrian according to time may be performed by the driving strategy determination module 318. The output from the driving path generation module 314 is information in which the driving path is described, the information may be output in the form of a coefficient of a cubic or quartic equation, or a coordinate list according to the time frame, and the information is not limited to a specific expression form.

The control parameter output module 312 may use the Stanley method for tracking a lateral control path, PID control for tracking a speed profile or the like so as to follow a trajectory generated by collecting the determined speed profile and a point-level path (PLP).

The controller 310 may control autonomous driving of the vehicle according to the control parameter.

Figure 4:
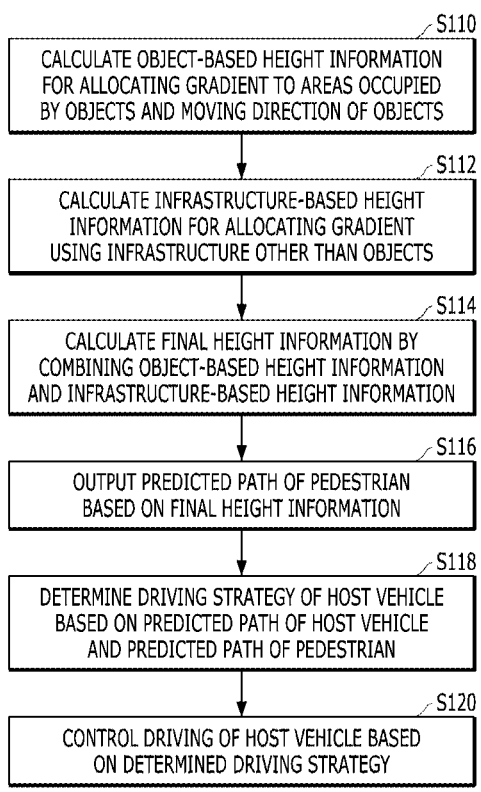
FIG. 4 is a flowchart representing a method for controlling autonomous driving of a vehicle according to one embodiment of the present disclosure.

FIG. 4 is a flowchart representing a method for controlling autonomous driving of a vehicle according to one embodiment of the present disclosure.

Object-based height information for allocating a gradient to areas occupied by objects and the moving directions of the object is calculated (S110).

Infrastructure-based height information for allocating a gradient using infrastructure other than the objects is calculated (S112).

Final height information by combining the object-based height information and the infrastructure-based height information is calculated (S114).

The path of a pedestrian is predicted based on the final height information (S116).

The driving strategy of a host vehicle is determined based on the predicted path of the host vehicle and the predicted path of the pedestrian (S118).

Driving of the host vehicle is controlled based on the determined driving strategy (S120).

Figure 5:
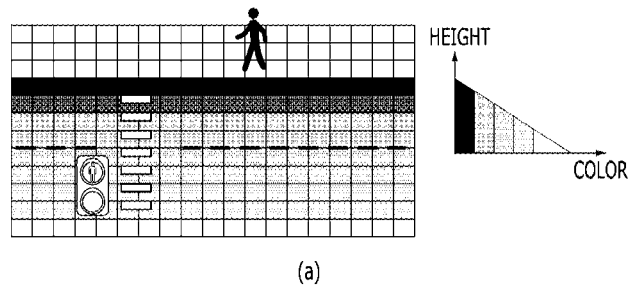
FIGS. 5 and 6 are views illustrating the functions of an infrastructure-based height determination module according to one embodiment of the present disclosure.
Figure 5:
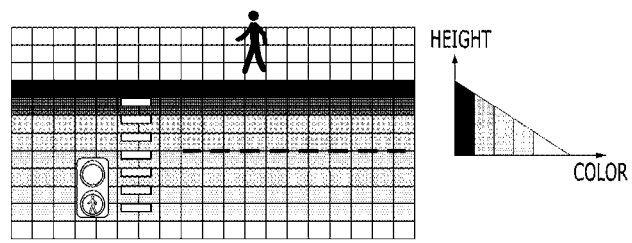
Figure 6:
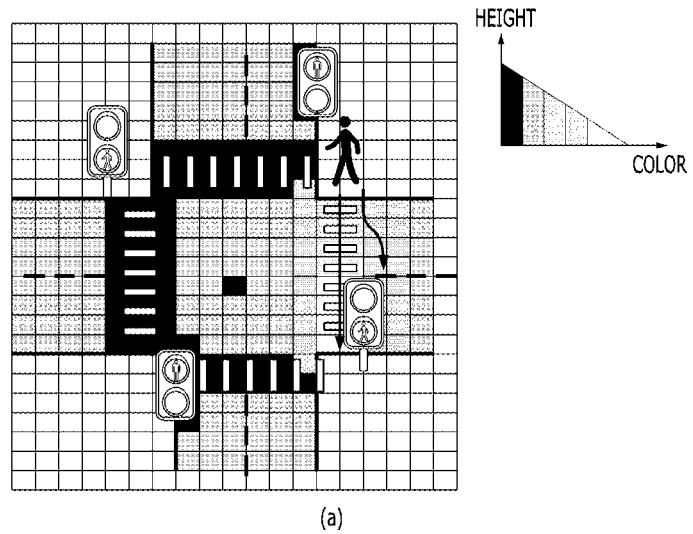
Figure 6:
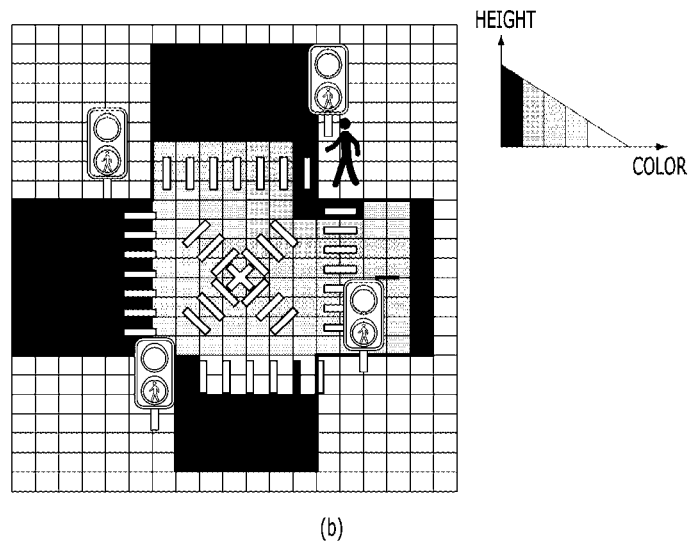

FIGS. 5 and 6 are views illustrating the functions of the infrastructure-based height determination module according to one embodiment of the present disclosure, and exemplarily illustrate infrastructure-based heights determined depending on a signal of a traffic signal system.

FIGS. 5(a) and 5(b) exemplarily illustrate heights determined at a crosswalk of a general road, and particularly, FIG. 5(a) exemplarily illustrates heights determined when a red light is turned on and FIG. 5(b) exemplarily illustrates heights determined when a green light is turned on.

When a pedestrian signal is turned on in an area occupied by a crosswalk, a pedestrian crosses at the crosswalk. Therefore, the area occupied by the crosswalk has a very high gradient or a very high object progress and occupancy probability, compared to adjacent areas. The gradient at the crosswalk may be allocated in inverse proportion to a jaywalking rate of pedestrians according to countries or regions.

When the pedestrian signal is turned off in the area occupied by the crosswalk, the pedestrian does not cross at the crosswalk and vehicles pass the crosswalk, and thus, in this case, a general road and the crosswalk have similar gradients to each other. Here, when the pedestrian signal is turned off, modeling in which a gradient is provided to a part of the entry of the crosswalk may be executed so that the pedestrian is visible. Because crossing directions are two, objects may be classified into two groups corresponding to the two crossing directions. The general road may have a gradient field (or a grid map) in which heights are determined in all directions (two types of directions).

In a curb section spaced from the pedestrian signal by a designated distance or more, pedestrians generally tend to cross at the crosswalk after vehicles rapidly pass by the crosswalk, and are thus more likely to walk in the direction opposite the driving direction of the vehicles rather than to walk in the driving direction of the vehicles and then to cross at the crosswalk. Therefore, the gradient may be corrected to be decreased in the direction opposite the driving direction of the vehicles.

FIGS. 6(a) and 6(b) exemplarily illustrate heights determined at crosswalks of an intersection, and particularly, FIG. 6(a) exemplarily illustrates heights determined when the crosswalks are installed in four directions and FIG. 5(b) exemplarily illustrates heights determined when the crosswalks are installed in four directions and diagonal directions.

Because a pedestrian crosses to the other road side opposite a road side at which the pedestrian is currently located, the road side at which the pedestrian is currently located may have the highest position, and the other road side may have the lowest position. A gradient may be allocated to an area between both road sides so as to gradually change in height.

Because crossing directions are four, objects may be classified into four groups corresponding the four crossing directions, and the intersection may have a grid field (or a grid map) in which heights are determined in all directions (four types of directions). Here, because pedestrians prefer to go down a hill rather than to go up the hill when there is a gradient on an actual road, the sum or the weighted sum of an actual gradient and a virtual gradient may be calculated. Final summed heights at respective positions are used to calculate a final gradient, and this will be used subsequently when the predicted path of a pedestrian is formed.

Here, height values may be allocated to respective grid cells of a road on a precise map. Grid information including the height values may be converted into a matrix and be used to generate a predicted path based on Gradient Descent or a Long Short-Term Memory (LSTM) of deep learning.

FIGS. 7 to 12 are views illustrating a pedestrian behavior modeling method for setting the functions of an object-based height determination module according to one embodiment of the present disclosure.

Figure 7:
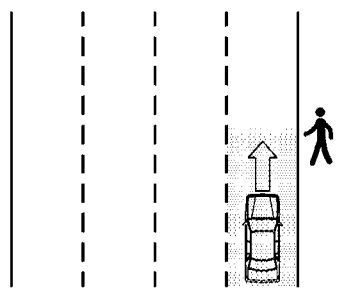
FIGS. 7 to 12 are views illustrating a pedestrian behavior modeling method for setting the functions of an object-based height determination module according to one embodiment of the present disclosure.
Figure 7:
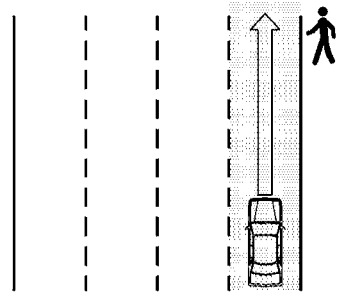
Figure 7:
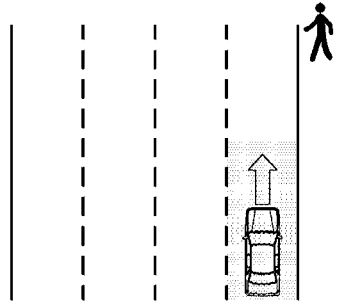
Figure 7:
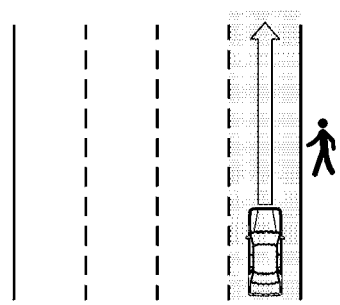
Figure 8:
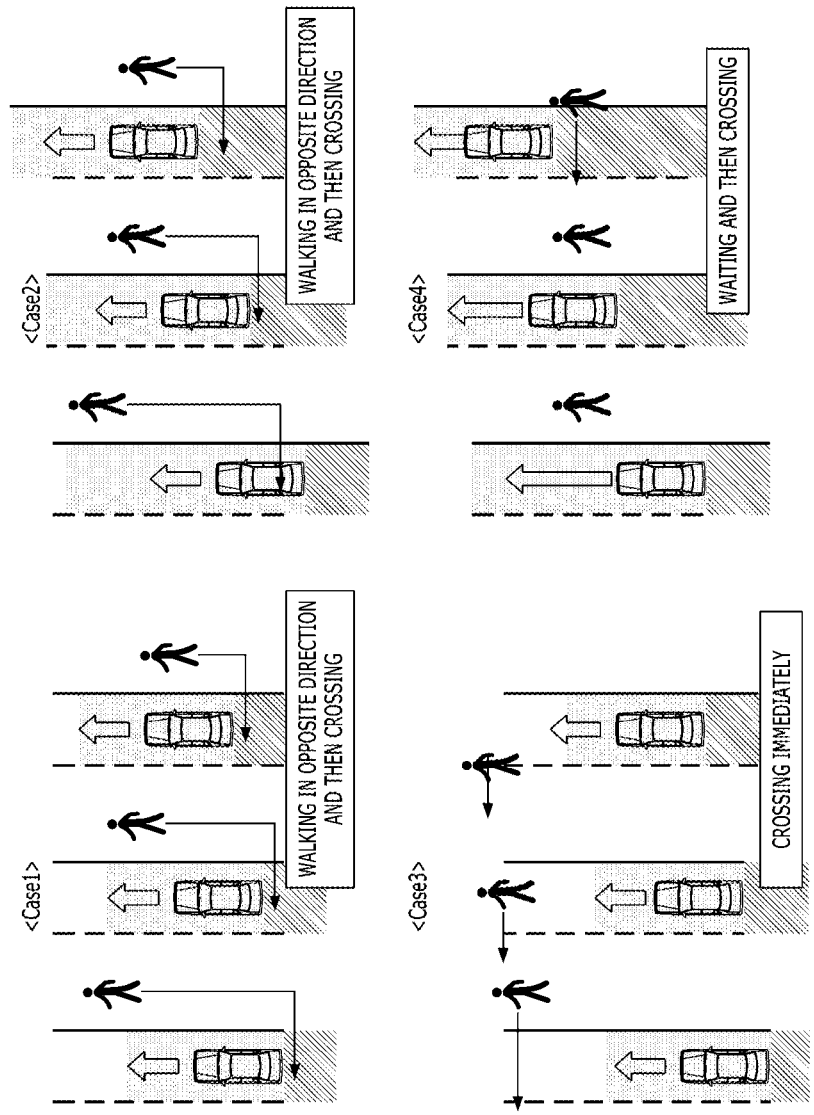

FIGS. 7 and 8 are views exemplarily illustrating a method for modeling behavior of a pedestrian depending on the position and speed of a vehicle. FIG. 7 is a view illustrating situations of a pedestrian who desires to cross a road depending on case, and FIG. 8 is a view illustrating predicted paths of the pedestrian in the respective cases.

<Case 1> of FIG. 7 exemplarily illustrates a situation in which a vehicle slowly drives a short distance from the pedestrian on a road which the pedestrian desires to cross. FIG. 8 illustrates the predicted path of the pedestrian under the condition of <Case 1>. Referring to FIG. 8, in the situation of <Case 1>, the vehicle is within the short distance, and thus there is a high probability that the pedestrian will cross the road after the vehicle passes by. Further, in order to shorten a time taken to cross the road, there is a high probability that the pedestrian will move in the direction opposite the driving direction of the vehicle and then crosses the road after the vehicle passes by. In <Case 1>, a time TTC taken for the vehicle to pass by the pedestrian may be set to a normal TTC.

<Case 2> exemplarily illustrates a situation in which a vehicle rapidly drives a long distance from the pedestrian on a road which the pedestrian desires to cross. FIG. 8 illustrates the predicted path of the pedestrian under the condition of <Case 2>. Referring to FIG. 8, in the situation of <Case 2>, the vehicle is rapidly approaching the pedestrian, and thus there is a high probability that the pedestrian will cross the road after the vehicle passes by. Further, in order to shorten a time taken to cross the road, there is a high probability that the pedestrian will move in the direction opposite the driving direction of the vehicle and then crosses the road after the vehicle passes by. In <Case 2>, a time TTC taken for the vehicle to pass by the pedestrian is regarded as being similar to the time TTC in <Case 1>, and may thus be set to the normal TTC.

<Case 3> exemplarily illustrates a situation in which a vehicle slowly drives a long distance from the pedestrian on a road which the pedestrian desires to cross. FIG. 8 illustrates the predicted path of the pedestrian under the condition of <Case 3>. Referring to FIG. 8, in the situation of <Case 3>, the vehicle is slowly approaching the pedestrian from the long distance, and thus there is a high probability that the pedestrian will cross the road before the vehicle passes by. In <Case 3>, because there is a high probability that the pedestrian will immediately cross the road for safety's sake, a time TTC taken for the vehicle to pass by the pedestrian may thus be set to a long TTC.

<Case 4> exemplarily illustrates a situation in which a vehicle slowly drives a short distance from the pedestrian on a road which the pedestrian desires to cross. FIG. 8 illustrates the predicted path of the pedestrian under the condition of <Case 4>. Referring to FIG. 8, in the situation of <Case 4>, the vehicle is within the short distance and is rapidly approaching the pedestrian, and thus there is a high probability that the pedestrian will cross the road after the vehicle passes by. Further, because the vehicle is within the short distance, in order to shorten the travel distance of the pedestrian, there is a high probability that the pedestrian will wait in place and then cross the road after the vehicle passes by. Therefore, a time TTC taken for the vehicle to pass by the pedestrian may thus be set to a short TTC.

Figure 9:
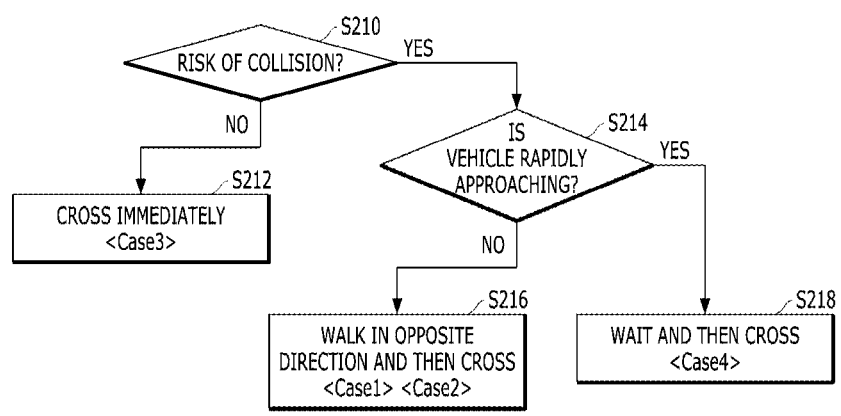

FIG. 9 exemplarily illustrates a process for modeling the moving speed of the pedestrian in each case.

The pedestrian who desires to cross a road determines whether or not there is a risk of collision with a vehicle (S210). The risk of collision with the vehicle may be determined in consideration of both a distance from the vehicle and the speed of the vehicle.

Upon determining that there is no risk of collision with the vehicle, there is a high probability that the pedestrian will immediately cross the road (S212). For example, this situation may correspond to <Case 3> in which the distance between the pedestrian and the vehicle is long and the vehicle is slowly driving.

Upon determining that there is a risk of collision with the vehicle in S210, it is determined whether or not the speed of the approaching vehicle is high (S214).

Upon determining that the speed of the vehicle is high, there is a high probability that the pedestrian will wait in place and then cross the road after the vehicle passes by (S218). For example, this situation may correspond to <Case 4> in which the distance between the pedestrian and the vehicle is short and the vehicle is rapidly driving.

Upon determining that the speed of the vehicle is low, there is a high probability that the pedestrian will walk in the direction opposite the driving direction of the vehicle, i.e., walk so as to face the vehicle, and then cross the road after the vehicle passes by (S216). For example, this situation may correspond to <Case 1> in which the vehicle is slowly driving a short distance from the pedestrian, or <Case 2> in which the distance between the pedestrian and the vehicle is long but the vehicle is rapidly driving.

Figure 10:
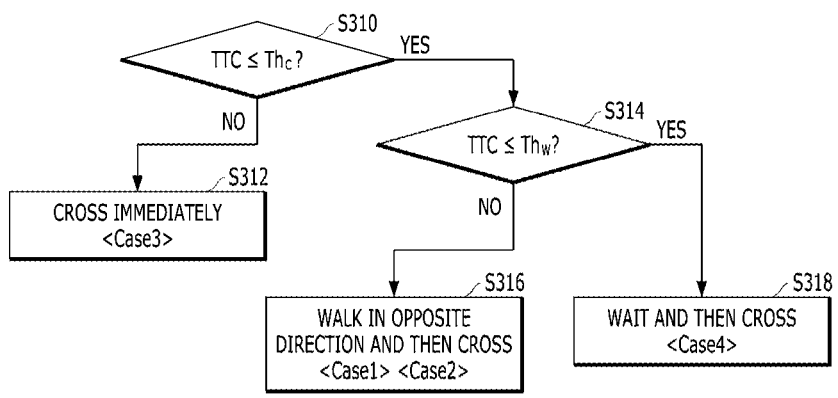

FIG. 10 exemplarily illustrates a process for modeling the moving speed of the pedestrian depending on the time TTC taken for the vehicle to pass by the pedestrian. In FIG. 10, Thw indicates a time for which the pedestrian can wait for the vehicle to pass by. Thc indicates a time taken for the pedestrian to avoid a collision with the vehicle in consideration of the stopping distance of the vehicle in front of the pedestrian. The time Thc and the time Thw may undergo parameter tuning through deep learning, and may be derived through a statistical method, application of regulations or the like.

In order to model the speed of the pedestrian who desires to cross a road, it is determined whether or not TTC is equal to or shorter than Thc (S310). That is, it is determined whether or not the time TTC taken for the vehicle to pass by the pedestrian is equal to or shorter than the time Thc taken for the pedestrian to avoid a collision with the vehicle in consideration of the stopping distance of the vehicle in front of the pedestrian.

When TTC is longer than Thc, it may be predicted that the pedestrian will immediately cross the road (S312). That is, when the time TTC taken for the vehicle to pass by the pedestrian is longer than the time Thc taken for the pedestrian to avoid a collision with the vehicle, there is high probability that the pedestrian will determine a safe state and thus immediately cross the road before the vehicle passes by (<Case 3>).

When TTC is equal to or shorter than Thc, there is a high probability that the pedestrian will cross the road after the vehicle passes by for safety's sake. Thereafter, it is determined whether or not TTC is equal to or shorter than Thw (S314). That is, it is determined that the time TTC taken for the vehicle to pass by the pedestrian is equal to or shorter than the time Thw for which the pedestrian can wait for the vehicle to pass by.

When TTC is longer than Thw, it may be predicted that the pedestrian will walk in the direction opposite the driving direction of the vehicle and then cross the road (S316). That is, when the time TTC taken for the vehicle to pass by the pedestrian is longer than the time Thw for which the pedestrian can wait for the vehicle to pass by, there is a high probability that, in order to shorten time, the pedestrian will move in the direction opposite the driving direction of the vehicle and then cross the road after the vehicle passes by (<Case 1> and <Case 2>).

When TTC is shorter than Thw, it may be predicted that the pedestrian will wait in place and then cross the road after the vehicle passes by (<Case 3>).

Figure 11:
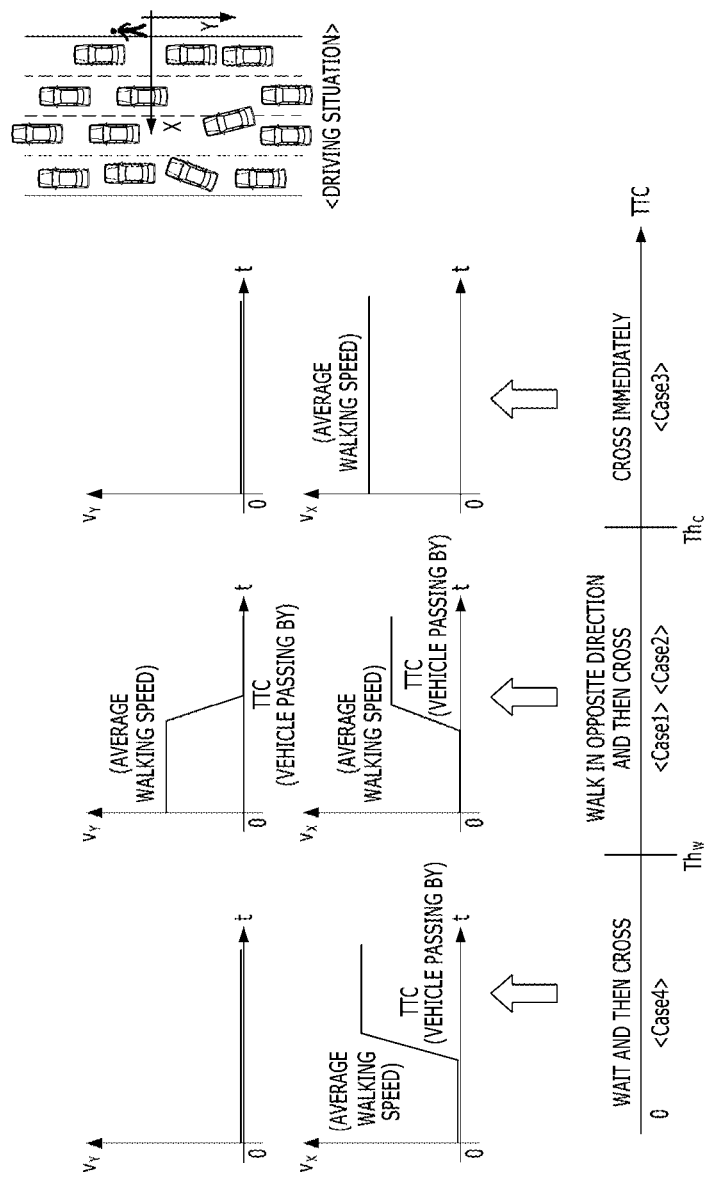

FIG. 11 is a view illustrating a method for modeling the speed of the pedestrian depending on TTC.

Referring to the situations in the respective cases represented along the time axis of TTC, in <Case 4> in which TTC is relatively short, i.e., the time TTC taken for the vehicle to pass by the pedestrian is shorter than the time Thw for which the pedestrian can wait for the vehicle to pass by, the pedestrian waits for the vehicle to pass by, and then crosses the road.

In <Case 1> and <Case 2> in which TTC is normal, i.e., the time TTC taken for the vehicle to pass by the pedestrian is longer than the time Thw for which the pedestrian can wait for the vehicle to pass by but is shorter than the time Thc taken for the pedestrian to avoid a collision with the vehicle, the pedestrian walks in the direction opposite the driving direction of the vehicle, and then crosses the road after the vehicle passes by.

In <Case 3> in which TTC is long, i.e., the time TTC taken for the vehicle to pass by the pedestrian is longer than the time Thc taken for the pedestrian to avoid a collision with the vehicle, the pedestrian immediately crosses the road before the vehicle passes by.

Graphs illustrated in FIG. 11 represent a result of modeling of the speed of the pedestrian in each of the above-described cases. In modeling, the crossing direction of the pedestrian is set to the X-axis, a direction parallel to the road is set to the Y-axis, the crossing speed of the pedestrian is set to $V_X$, and the moving speed of the pedestrian along the road is set to $V_Y$. The graphs in each case represent a change in the crossing speed Vx of the pedestrian over the time t and a change in the moving speed Vy of the pedestrian moving along the road over time t.

In <Case 4> in which TTC is relatively short, i.e., TTC is shorter than Thw, the pedestrian waits in place and then crosses the road after the vehicle passes by. Therefore, the crossing speed $V_Y$ is 0 for a waiting time, and the crossing speed $V_X$ is gradually increased after TTC, i.e., a point in time when the vehicle passes by. The gradually increased crossing speed $V_X$ may maintain an average walking speed until the pedestrian finishes crossing the road. Because the pedestrian waits in place and then crosses the road, the moving speed $V_Y$ of the pedestrian along the road maintains 0.

In <Case 1> and <Case 2> in which TTC is normal, i.e., TTC is longer than Thw but is shorter than Thc, the pedestrian walks in the direction opposite the driving direction of the vehicle and then crosses the road after the vehicle passes by. Therefore, the moving speed $V_Y$ of the pedestrian along the road is maintained until TTC, i.e., the point in time when the vehicle passes by, and the crossing speed $V_X$ is gradually increased after TTC.

In <Case 3> in which TTC is long, i.e., TTC is longer than Thc, the pedestrian immediately crosses the road before the vehicle passes by. Therefore, the crossing speed $V_X$ may maintain the average walking speed until the pedestrian finishes crossing the road. Because the pedestrian in place immediately crosses the road, the moving speed $V_Y$ of the pedestrian along the road maintains 0.

Figure 12:
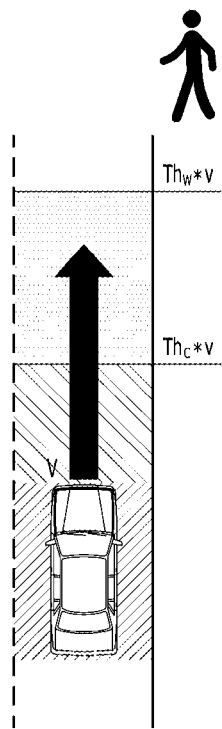

FIG. 12 is a view illustrating factors which must be considered when the object-based height determination module 210 according to one embodiment of the present disclosure determines the height of an object.

When object-based heights are calculated, not only a space actually occupied by the object, but also the speed of the object, i.e., the speed v of a vehicle, and distances according to the time Thw for which the pedestrian can wait for the vehicle to pass by and the time Thc taken for the pedestrian to avoid a collision with the vehicle in consideration of the stopping distance of the vehicle in front of the pedestrian must be considered together.

Referring to FIG. 12, an area which is actually occupied by the vehicle may be represented as having the greatest height. A distance Thc*v to which the vehicle moves for the time Thc taken for the pedestrian to avoid a collision with the vehicle in consideration of the stopping distance of the vehicle in front of the pedestrian may be represented as having a lower height. A distance Thw*v to which the vehicle moves for the time Thw for which the pedestrian can wait for the vehicle to pass by may be represented as having a much lower height. As such, during modeling of the height of the object, heights are sequentially allocated not only to an area surrounding the outline of the object but also to areas ahead of the object, thereby being capable of calculating the predicted path of the pedestrian.

Figure 13:
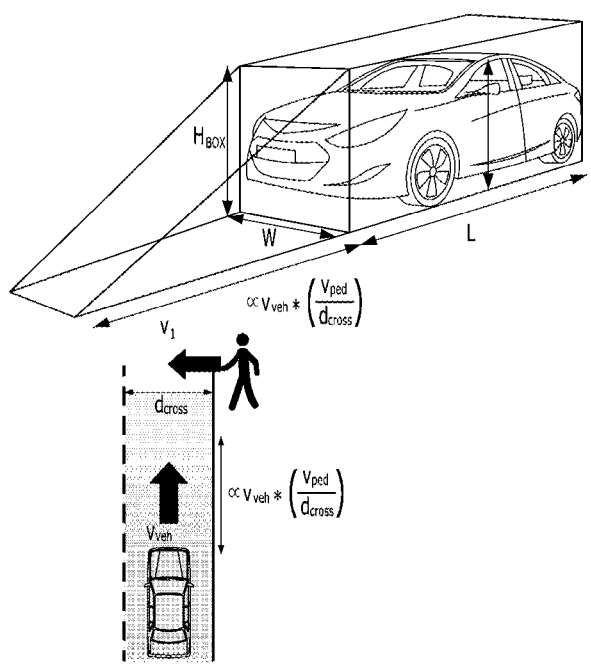
FIG. 13 is a view illustrating the functions of the object-based height determination module according to one embodiment of the present disclosure.

FIG. 13 is a view illustrating a method for determining the height of an object by the object-based height determination module 210 according to one embodiment of the present disclosure. In FIG. 13, $d_{cross}$ indicates the distance of a host vehicle lane, which a pedestrian crosses. $V_{ped}$ indicates the crossing speed of the pedestrian, and $V_{veh}$ indicates the moving speed of a vehicle.

Referring to FIG. 13, because the pedestrian feels threatened differently depending on types of vehicles, the height of buses or trucks rather than small vehicles needs to be set differently. Because the pedestrian generally feels more threatened by a larger vehicle, it is necessary to set the height $\propto H_{BOX}$ of an object, i.e., a vehicle, in proportion to the width W, length L and height H of the vehicle. In general, even though a vehicle and a truck have the same size, the pedestrian feels more threatened by the truck than the vehicle, and the heights of the different types of vehicles may be set to different heights $\propto H_{BOX}$. For example, different heights of vehicles may be decreased in order of bus>construction vehicle>truck>car>two-wheel vehicle.

A height model may be set such that a greater height is allocated to an area right in front of the vehicle as the vehicle drives forwards, and the height is decreased as the area is farther away from the position of the vehicle in the forward direction because the pedestrian feels more threatened as he/she is closer to the vehicle.

Because the vehicle drives along a road, the height may be formed along the lane in which the vehicle drives in the forward direction. The vehicle changing lanes passes through discontinuity between lane links, and in this case, the height may be formed along a curved path for lane change in the driving direction of the vehicle.

The length of a section having a height gradually decreased in the forward direction of the vehicle may be proportional to the product of a time taken for the pedestrian to cross the corresponding lane and the speed of the vehicle.

Grid information having the above-described height values is converted into a matrix, and the predicted path of the pedestrian is extracted based on Gradient Descent algorithm and the Long Short-Term Memory (LSTM) of deep learning.

Figure 14:
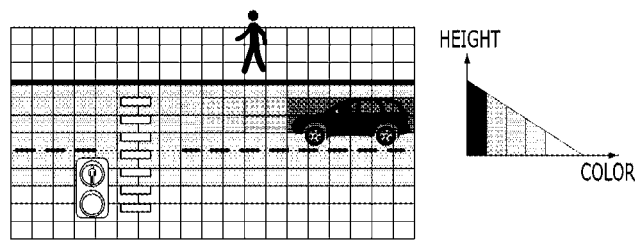
FIGS. 14 and 15 are views illustrating the functions of a final height fusion module according to one embodiment of the present disclosure.
Figure 15:
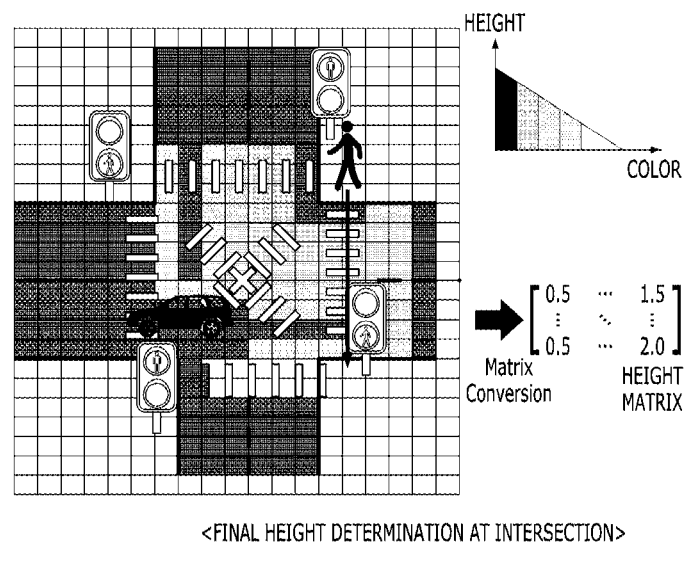

FIGS. 14 and 15 are views illustrating the functions of the final height fusion module 214 according to one embodiment of the present disclosure, and more concretely, FIG. 14 is a view exemplarily illustrating determined final heights on a general road, and FIG. 5 is a view exemplarily illustrating determined final heights at an intersection.

Height information output from the object-based height determination module 210 and height information output from the infrastructure-based height determination module 212 are used as input to the final height fusion module 214. The height information output from the object-based height determination module 210 is height information allocated by an object, and the height information output from the infrastructure-based height determination module 212 is height information allocated by infrastructure, such as a road shape, signal information, a crosswalk or the like. The final height fusion module 214 may determine final heights by appropriately fusing the heights allocated by the object and the heights allocated by the infrastructure.

The final height fusion module 214 may allocate a height acquired by weighted summation according to determination importance of the object and the infrastructure. For example, when the height of a position (20, 20) of a grid cell determined by the infrastructure is 0.3 and the height of the position (20, 20) of the grid cell determined by the object is 0.4, the final height of the position of this grid cell may be 0.7 (0.3×1+0.4×1). Here, a weight may be a tuning parameter.

The final height fusion module 214 may allocate an object occupancy probability of being occupied by an object, such as a structure, a pedestrian or a vehicle, in the next time frame rather than geometric height information to each position. Here, the corresponding height information may be updated in each time frame and, as needed, values between respective time frames may be interpolated so as to achieve more precise determination. As interpolation, linear interpolation, nonlinear interpolation, machine learning, etc. may be used without being limited thereto.

The final height fusion module 214 may convert the determined height information into a matrix of values allocated to equal intervals and respective discrete coordinates of a two-dimensional grid, and may then output the matrix. Here, a height matrix converted from the grid map may be output.

Figure 16:
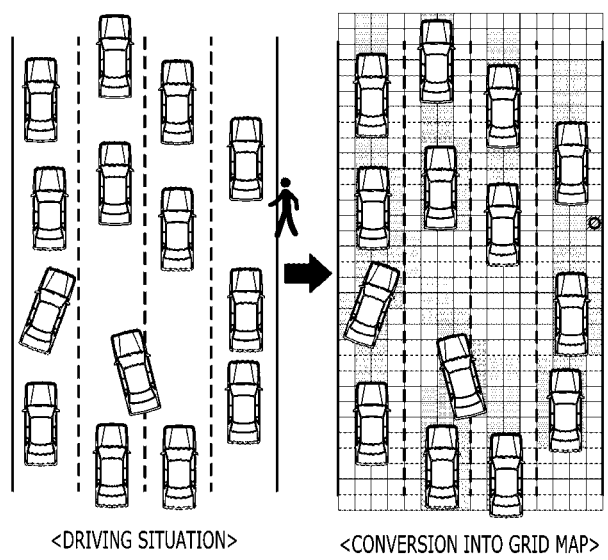
FIGS. 16 to 18 are views illustrating a method for predicting a pedestrian path by a predicted pedestrian path generation module according to a first embodiment of the present disclosure.
Figure 17:
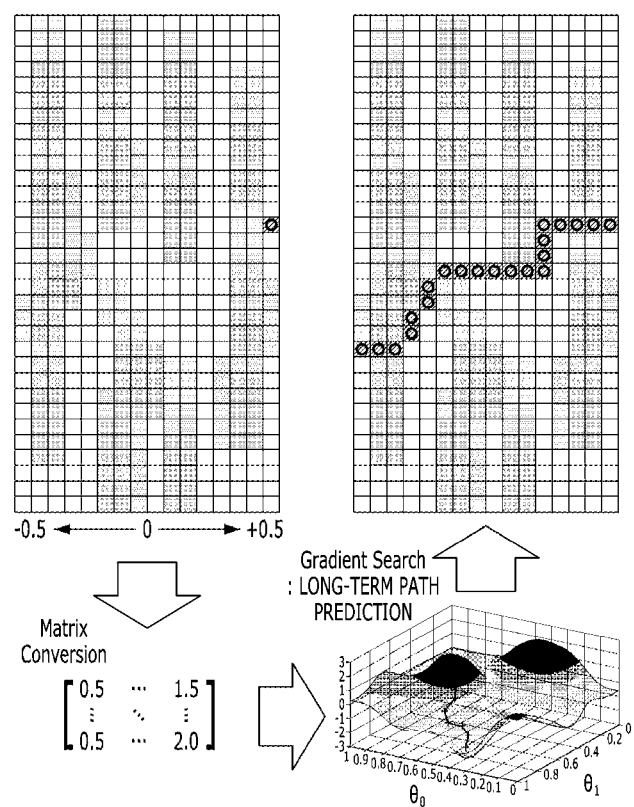
Figure 18:
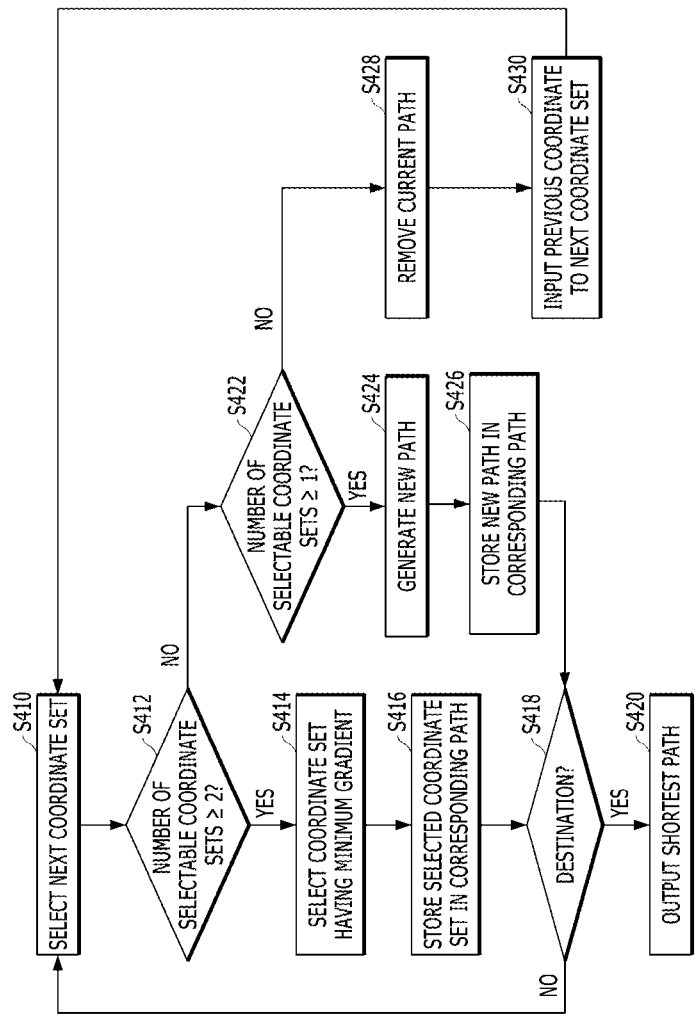

FIGS. 16 to 18 are views illustrating a method for predicting a pedestrian path by a predicted pedestrian path generation module according to a first embodiment of the present disclosure. The predicted pedestrian path generation module 216 according to the first embodiment may predict the pedestrian path based on Gradient Descent.

The predicted pedestrian path generation module 216 may search a path through which space and time losses taken are minimized in consideration of a gradient from the starting position of a pedestrian to the opposite side using Gradient Descent.

Gradient Descent is designed to search all possible optimal solutions on a path in the entire area, and thus proposes a path having a comparatively high probability which the pedestrian moves therealong, rather than a predicted path in which the dynamic characteristics of the pedestrian are reflected in the short term, thereby being appropriate for long-term prediction. However, Gradient Descent may be applied to short-term prediction by assigning a greater weight to a section closer to the current position of the pedestrian.

Input to the predicted pedestrian path generation module 216 may include the height matrix output from the final height fusion module 214. As shown in FIG. 16, a grid map may be configured such that height is gradually decreased from the starting point of a pedestrian to a point of the opposite side. On the grid map of FIG. 16, a lateral gradient calculated by the infrastructure-based height determination module 212 is not reflected. Because vehicles drive forwards, the grid map may be configured such that the height is gradually decreased from a grid area, occupied by the vehicle, in the forward direction. Such a longitudinal gradient may be calculated by the object-based height determination module 210.

Referring to FIG. 17, height values may be respectively allocated to respective grid cells on a road on a precise map. Grid information having the height values may be converted into a matrix, and the predicted path may be generated based on Gradient Descent.

On the grid map, a gradient from the starting point, at which the pedestrian is currently located, to the opposite side may be formed and, in this case, two or more method of Gradient Descent may be applied. For example, a single path routing technique, in which a point having the greatest gradient in a negative direction on a single path is searched in each time frame and an arbitrary path is selected at a branch, may be applied as one method. A multi-path routing technique, in which multiple paths to a destination are secured by copying a path at each branch, and then a path having the shortest distance is searched, may be applied as another method. Here, when discrimination of height information is not clear, many branches occur and may thus occupy many resources, when the multi-path routing technique is used. In this case, in consideration of usable resources, the single path routing technique or a technique in which a smaller number of multiple paths are calculated may be used. When the resources are sufficient or height discrimination is clear and thus many branches do not occur, multiple paths may be calculated in consideration of the number of all cases, and then the shortest distance may be calculated. Further, the above methods may be combined according to circumstances.

FIG. 18 is a flowchart representing a loop-type method for generating a predicted pedestrian path.

In order to generate the predicted pedestrian path in the loop manner, a coordinate set is selected (S410), and it is determined whether or not the number of selectable coordinate sets is two or more (S412).

Upon determining that the number of the selectable coordinate sets is two or more, the coordinate set having the minimum gradient is selected (S414), and is stored in a corresponding path (S416).

It is confirmed whether or not the stored path is a path to a destination (S418) and, upon confirming that the stored path is the path to the destination, the shortest path which is stored is output (S420). Upon confirming that the stored path is not the path to the destination, the method returns to S410, a next coordinate set is selected and then the same subsequent operations are performed.

When the number of the selectable coordinate sets is less than two in S414, it is determined whether or not the number of the selectable coordinate sets is one or more (S412).

Upon determining that the number of the selectable coordinate sets is one or more, a new path is generated (S424), and is stored in the corresponding path (S426). It is confirmed whether or not the stored path is the path to the destination (S418) and, upon confirming that the stored path is the path to the destination, the shortest path which is stored is output (S420). Upon confirming that the stored path is not the path to the destination, the method returns to S410, a next coordinate set is selected and then the same subsequent operations are performed.

When the number of the selectable coordinate sets is less than one, the current state is a state in which no coordinate sets are selectable any more, i.e., a state in which the path is interrupted, and thus, the current path is removed (S428), and a previous coordinate set is input to a next coordinate set (S430). Thereafter, the method returns to S410, the next coordinate set is selected and then the same subsequent operations are performed.

The predicted pedestrian path may be generated through the above-described loop-type method.

Otherwise, a recursive method for generating a predicted pedestrian path may be used. Hereinafter, an example of a recursive method for generating a predicted pedestrian path using a pseudocode will be described.

<Pseudocode for Generating Predicted Pedestrian Path>

```
def GradientDescent(CurrentStep):
    NextStep=FindNextStep(CurrentStep)
    If NextStep == Destination:
        SavePath(Path, NextStep)
        return min(Path)
    else:
        If Num(NextStep) > 1:
            SavePath(min(NextStep))
            GradientDescent(min(NextStep))
        elif Num(NextStep) == 1:
            SavePath(Path, NextStep)
            GradientDescent(NextStep)
        else:
            DeletePath(Path)
```

As described above, the pseudocode and the flowchart may be used to generate paths using recursive and loop-type algorithms in the multi-path routing technique of Gradient Descent. There may be a plurality of algorithms following the above-described logic even though they have differences in implementation. In order to execute the predicted pedestrian path generation method, various methods which may derive a path so as to minimize a cost function spatially and temporally in a gradient or height field may be applied.

The single path routing technique may be included as one case (Number of Selectable Coordinate Set=1) in the multi-path routing technique. When the logic is implemented, proper handling of a return value may be required in order to implement a recursive function. When the logic is implemented in the loop manner, proper handling may be required so as to avoid infinite regression, by confirming whether or not a next point is not present on the previous path. A path generated at a branch point is stored as a new path in a path list. Scores may be stored so as to be directly proportional to or inversely proportional to the total length of respective paths in the path list, and then, the subsequent module may select a final path in order of priority of the scores.

Figure 19:
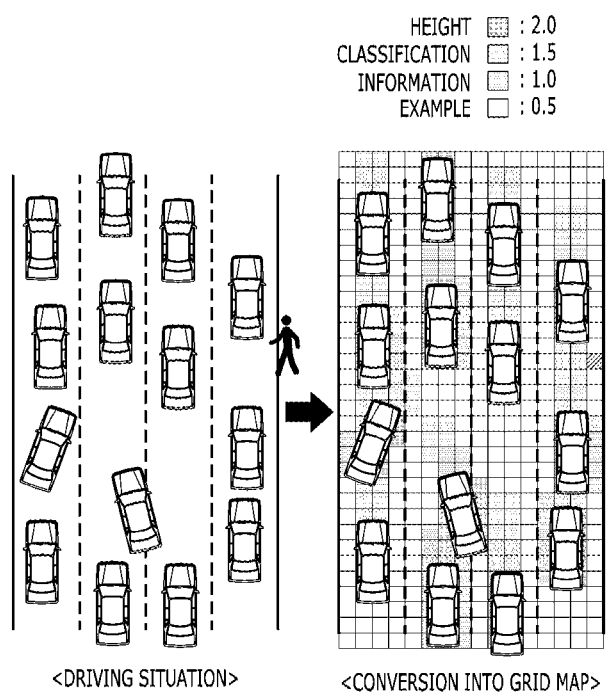
FIGS. 19 and 20 are views illustrating a method for predicting a pedestrian path by a predicted pedestrian path generation module according to a second embodiment of the present disclosure.
Figure 20:
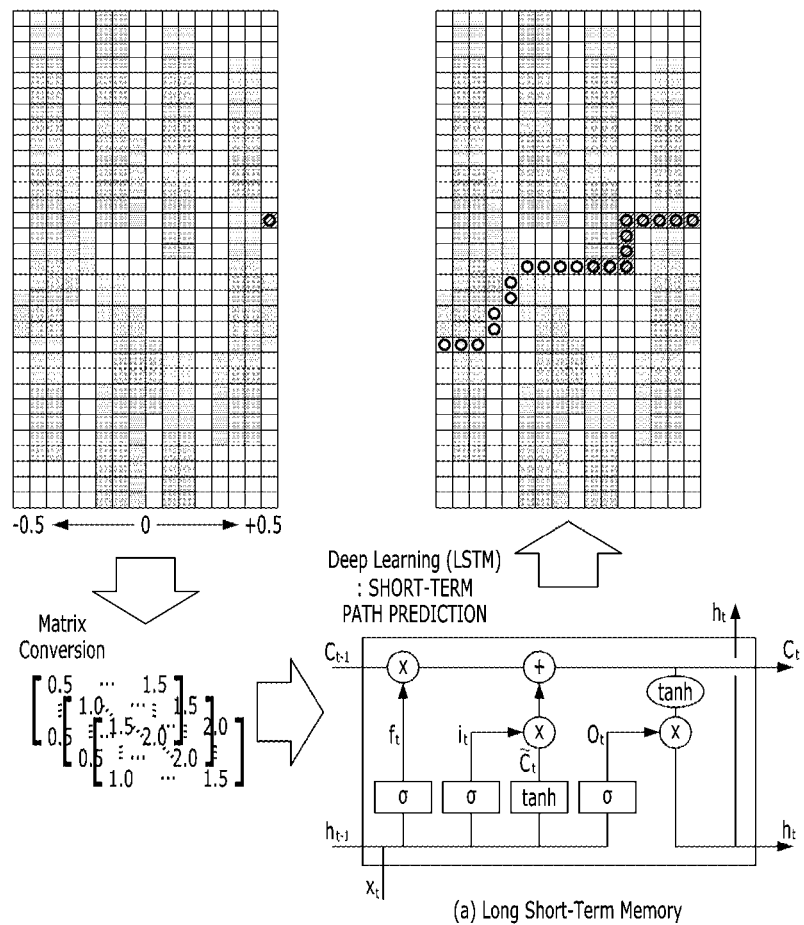

FIGS. 19 and 20 are views illustrating a method for predicting a pedestrian path by a predicted pedestrian path generation module according to a second embodiment of the present disclosure. The predicted pedestrian path generation module 216 according to the second embodiment of the present disclosure may predict the pedestrian path based on the Long Short-Term Memory (LSTM) of deep learning.

The LSTM is one type of RNN model of deep learning of machine learning algorithms, which outputs a predicted future sequence using past continuous sequence values as input. When the LSTM is applied to the predicted pedestrian path generation module 216, the predicted pedestrian path generation module 216 may receive a changed sequence, such as the past position of a pedestrian, dynamic information thereabout, peripheral object information, shape information, etc., and may output a predicted path which is a group of predicted positions.

The predicted pedestrian path generation module 216 receives the position of the pedestrian and the dynamic information thereabout, the positions of peripheral vehicles and the dynamic information thereabout, classification information, the shape information, such as contours and boxes of the objects, precise map values, and a predetermined matrix. These input values may include not only current input values but also previous input values for N time frames in the past, and may be used as input to the LSTM. Here, as relations between the input values of the time frames are increased, information about a larger number of time frames may be stored.

Input to the predicted pedestrian path generation module 216 may include the height matrix output from the final height fusion module 214. As shown in FIG. 19, a grid map may be configured such that height is gradually decreased from the starting point of a pedestrian to a point of the opposite side. On the grid map of FIG. 19, a lateral gradient calculated by the infrastructure-based height determination module 212 is not reflected. Because vehicles drive forwards, the grid map may be configured such that the height is gradually decreased from a grid area, occupied by the vehicle, in the forward direction. Such a longitudinal gradient may be calculated by the object-based height determination module 210.

Referring to FIG. 20, height values may be respectively allocated to respective grid cells on a road on a precise map. Grid information having the height values may be converted into a matrix. Here, matrixes may be continuously output by N time frames in a sequence by synchronizing with the operating cycles of the sensors and logic. The predicted pedestrian path generation module 216 may receive matrixes continuously output for the N time frames in the sequence, and may generate the predicted path of the pedestrian base on the LSTM.

Because movement of objects and the future position of a pedestrian follow the Markov chain, even though the input values are accurate, there is a higher probability that predicted position values will become more inaccurate farther in the future. Therefore, as a point is farther away on the predicted path, accuracy of the predicted position value at this point may be decreased. Therefore, a greater weight may be applied in prediction of a short-term path but, when situations of the objects are not changed suddenly, a result of long-term prediction using a comparatively accurate input may be similar to a result of short-term prediction, and thus, the predicted pedestrian path based on the LSTM may be applied as a long-term predicted path.

Figure 21:
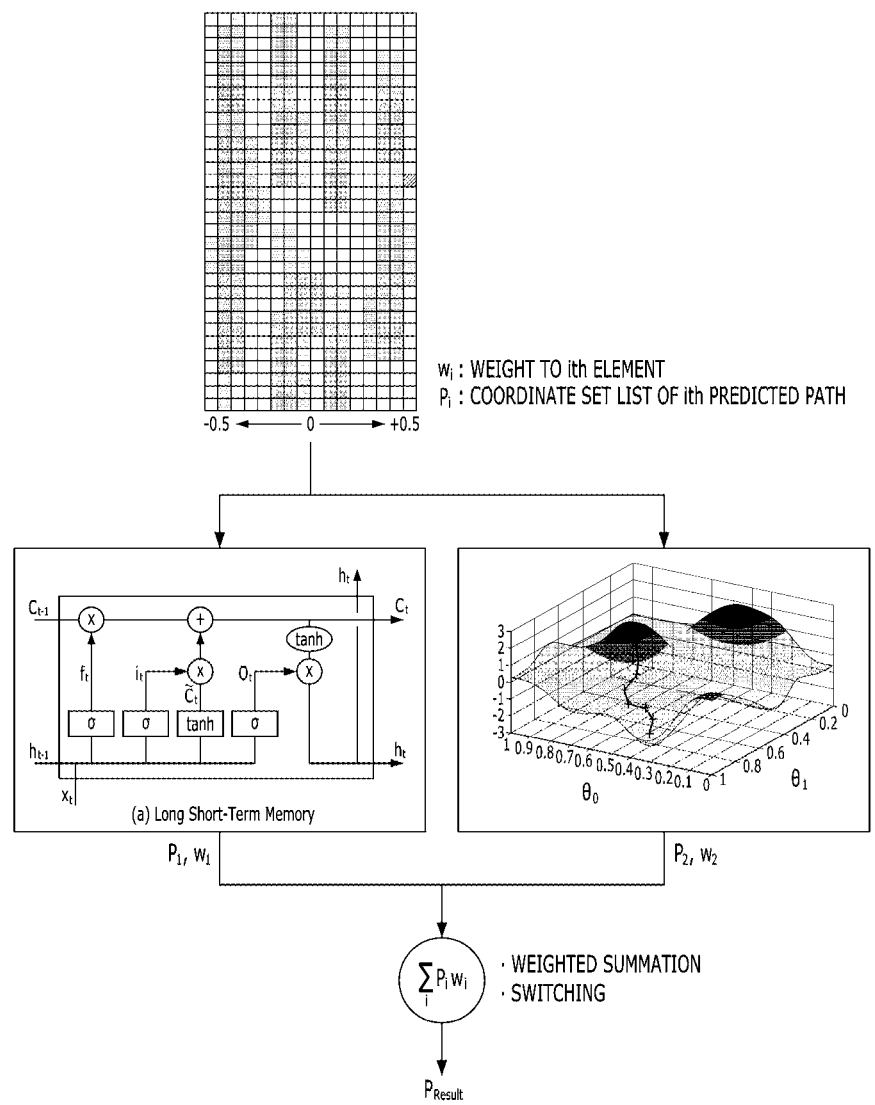
FIG. 21 is a view illustrating a method for predicting a pedestrian path by a predicted pedestrian path generation module according to a third embodiment of the present disclosure.

FIG. 21 is a view illustrating a method for predicting a pedestrian path by a predicted pedestrian path generation module according to a third embodiment of the present disclosure. The predicted pedestrian path generation module 216 according to the third embodiment of the present disclosure may predict the pedestrian path by complementarily combining Gradient Descent and the LSTM.

The predicted pedestrian path generation module 216 may determine similarities between multiple paths output based on Gradient Descent and a predicted path based on the LSTM in consideration of a distance between predicted positions on the paths per time frame through comparison.

Considering a difference between the positions of points on the two paths per time frame, a greater importance may be assigned to predicted values in the near future by allocating a greater weight to the near future. When the path based on the LSTM and the path based on Gradient Descent have different distances, the same method may be applied. In such a manner, similarity between the path based on Gradient Descent and the path based on the LSTM may be converted into a score. The predicted pedestrian path generation module 216 may determine the final score in the form of a weighted sum of the respective scores, thereby being capable of calculating the most appropriate path.

In order to complementarily combine the two methods, not only such a weighted summation method but also a situational switching method may be used, and combination of the two methods is not limited thereto and other combinations which may derive a reliable path may be used. The predicted pedestrian path generation module 216 may determine a final predicted path having reliability, comprehensively considering the lengths of paths based on Gradient Descent in which characteristics of the pedestrian are reflected, similarities between the paths based on Gradient Descent and the predicted path based on the LSTM, and risks.

Figure 22:
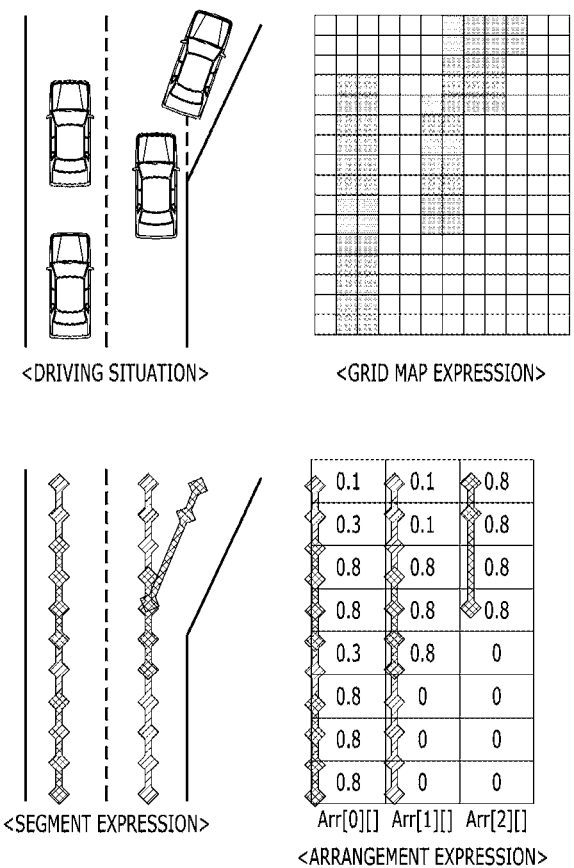
FIG. 22 is a view illustrating output generation methods executed by the final height fusion module according to other embodiments of the present disclosure.

FIG. 22 is a view illustrating output generation methods executed by the final height fusion module 214 according to other embodiments of the present disclosure.

Referring to FIG. 22, a method for expressing pedestrians, objects, a host vehicle, and the shape of peripheral roads is not limited to the grid map. The method may be extended to any data expression method which may express geometric information and information to describe the respective objects together.

<Segment expression> is a method which divides lane links on a precise map into small pieces, assigns segments to the respective pieces, and allocates height information to a specific segment.

<Arrangement expression> is a method which spreads 3-dimensional lanes of a road, arranges each lane into a 1-dimensional rectilinear form, and allocates respective heights to positions in the length direction. <Arrangement expression> may be implemented because connection relations on the precise map are known.

In <Grid map expression>, a height allocated to each grid area may be interpreted as a probability that an object is located at the corresponding position in the next time frame. When the height is interpreted as an object occupancy probability, multiple predicted paths corresponding to output may be interpreted as a group of positions having proceeding probabilities exceeding a designated threshold.

Figure 23:
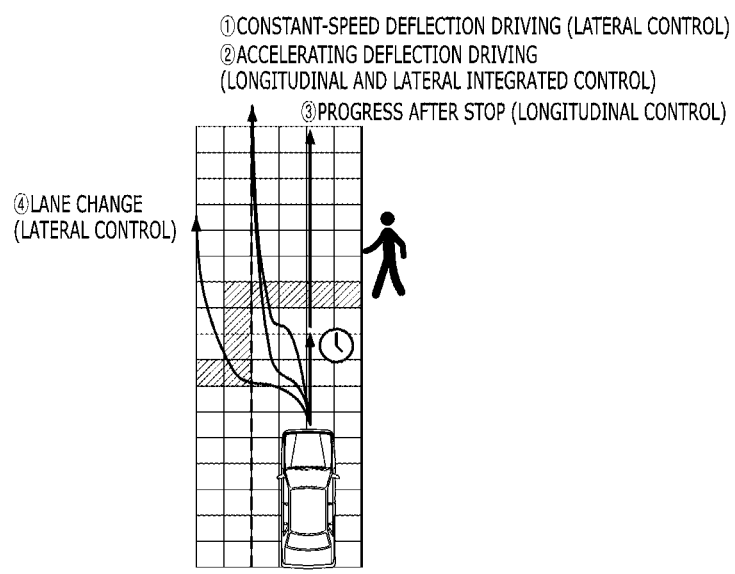
FIGS. 23 and 24 are views illustrating the functions of a driving strategy determination module according to one embodiment of the present disclosure.
Figure 24:
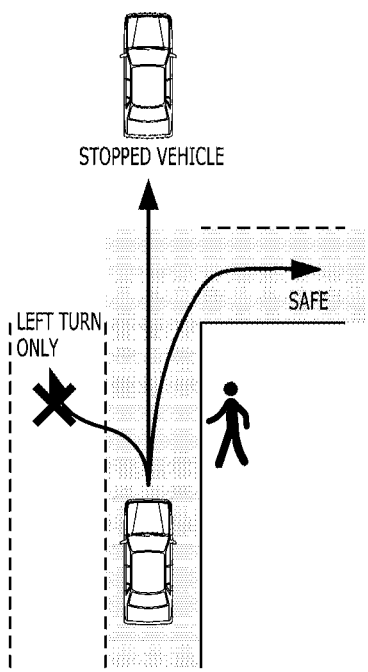

FIGS. 23 and 24 are views illustrating the functions of the driving strategy determination module 318 according to one embodiment of the present disclosure.

FIG. 23 is a schematic diagram illustrating a driving strategy determination method executed by the driving strategy determination module 318 according to one embodiment of the present disclosure.

Input to the driving strategy determination module 318 may include the final predicted pedestrian path output from the predicted pedestrian path generation module 216, position recognition information including the position of the host vehicle, dynamic information thereabout and the precise map, a driving path in the previous time frame, etc.

The driving strategy determination module 318 determines whether or not there is a probability of collision between the final predicted pedestrian path determined by the predicted pedestrian path generation module 216 and a path of the host vehicle predicted in the previous time frame. Upon determining that there is a probability of collision, the driving strategy determination module 318 calculates representative driving paths of the host vehicle, which do not collide with the pedestrian, based on the multi-path routing technique, and selects a final driving strategy through determination as to risks of collision between the final predicted path of the pedestrian and the respective driving paths.

When the driving strategy is determined, a multi-path generation-based control method, a longitudinal acceleration and deceleration control method, a lateral defection/lane change control method, and a longitudinal and lateral integration control method may be used.

In the multi-path generation-based control method, after random multiple paths are generated, natural paths which do not collide with the position of a pedestrian according to time on a predicted pedestrian path are selected, and then a host vehicle tracks the most appropriate path.

In the longitudinal acceleration and deceleration control method, a driving path determined in the previous time frame is maintained, and the speed of a host vehicle is accelerated or decelerated only in the longitudinal direction so that the host vehicle does not cross a pedestrian at a point in time when the host vehicle collides with the predicted path of the pedestrian.

In the lateral deflection/lane change control method, a conventional longitudinal speed profile is maintained, a host vehicle is deflected in the direction opposite a pedestrian or changes lanes only in the lateral direction of the host vehicle so as to avoid collision with the pedestrian.

Referring to FIG. 24, in the longitudinal and lateral integration control method, in a situation with which it is difficult to cope using each of the longitudinal acceleration and deceleration control method and the lateral defection/lane change control method, or in a situation in which integrated use of the two methods more naturally causes a driving gain, the two methods are integrated and used so that a host vehicle accelerates (or decelerates) around a pedestrian and simultaneously performs deflection driving or changes lanes so as to more stably avoid collision with the pedestrian.

The four methods for determining a driving strategy, the multi-path generation-based control method, the longitudinal acceleration and deceleration control method, the lateral defection/lane change control method, and the longitudinal and lateral integration control method, may be applied independently, or may be applied mutually complementarily, so as to determine a more effective driving strategy. In order to perform effective driving strategy determination, a strategy configured to minimize a dangerous situation may be selected by determining a risk of collision between the driving path depending on the strategy of a host vehicle and the predicted path of a pedestrian.

Output from the driving strategy determination module 318 may be front/in-path/cut-in vehicle information for generating the speed profile, precise map information (speed limits, speed bumps, road shapes, lane information, etc.), and peripheral interest object information for generating the driving path.

Figure 25:
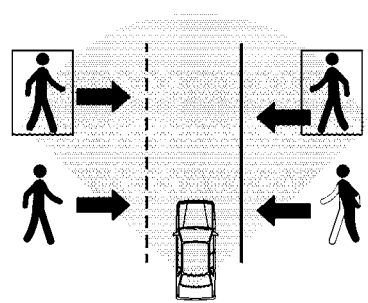
FIGS. 25 and 26 are views exemplarily illustrating a risk determination method for determining a strategy by the driving strategy determination module.
Figure 25:
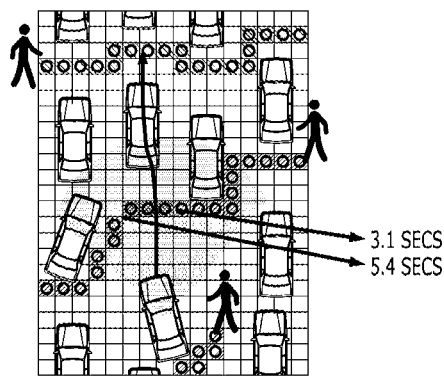
Figure 26:
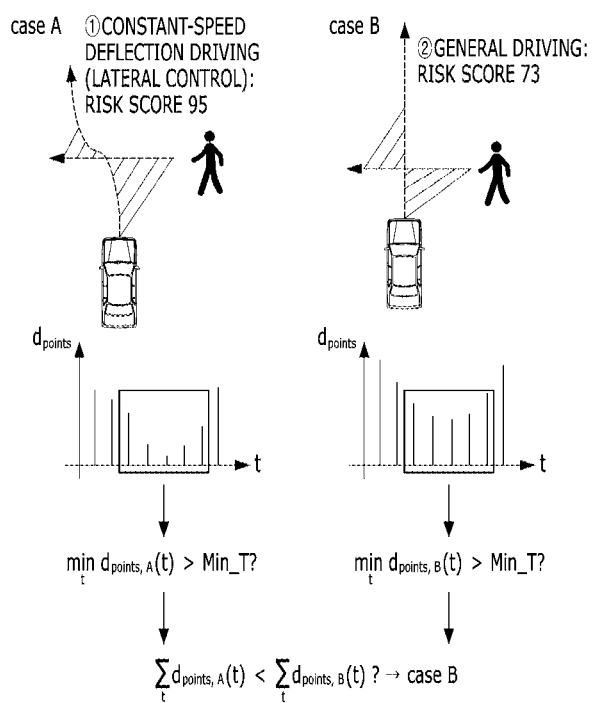

FIGS. 25 and 26 are views exemplarily illustrating a risk determination method for determining a strategy by the driving strategy determination module 318.

Referring to FIG. 25, the driving strategy determination module 318 may determine a probability of collision between the final predicted path of the pedestrian determined by the predicted pedestrian path generation module 216 and the predicted path of the host vehicle predicted in the previous time frame.

A region TTC, in which a pedestrian will run at full speed in the lateral direction and thus collide with the host vehicle, may be formed in a fan shape, as shown in <Method for selecting pedestrian of interest>. Here, as the maximum running speed of the pedestrian increases and as the speed of the host vehicle decreases, the width of the fan-shaped region TTC may increase. Pedestrians who are within the fan-shaped region TTC may be selected as pedestrians of interest.

In determination of risks, the driving strategy determination module 318 may determine risks by determining whether or not a difference between a target driving path of the host vehicle stored in the previous time frame and positions of the pedestrian according to time on the respective paths in the predicted path list of the pedestrian are equal to or less than a specific threshold. Further, the risks may be determined based on longitudinal/lateral TTCs between the host vehicle and the pedestrian other than a point in time when the host vehicle and the pedestrian cross each other on the predicted path. Here, in order to calculate the TTCs, the predicted path information by the previous module may be used. Further, the risks may be determined based on a lane which the pedestrian enters and the position of the pedestrian. Here, in order to acquire information about the lane which the pedestrian enters, the predicted path information by the previous module may be used.

The respective risks determined by the above-described method may be stored as scores on each of the respective predicted paths on the predicted path list of the pedestrian, and the corresponding scores may be determined as being directly proportional to or inversely proportional to the risks depending on a design intention.

FIG. 26 is a view illustrating a method for determining a risk of collision between a pedestrian of interest and the predicted path of a host vehicle.

Because an autonomous vehicle may drive based on a speed profile and a control path generated in advance, the planned path of the host vehicle may be known. The predicted path of the pedestrian output by the predicted path generation module 216 and the predicted path of the host vehicle predicted in the previous time frame may include position information of objects according to time. Therefore, predicted relative distances $d_{points}(t)$ between the respective objects according to time may be calculated. A probability of collusion between the two objects may be determined by comparing the predicted distance $d_{points}(t)$ between the respective objects.

A distance $d_{points}(t)$ between the pedestrian and the host vehicle at a time t is very short so as to be close to an actual distance to collision (<Min_T, Min_T being the minimum time taken for the host vehicle to avoid a collision), the corresponding path of the host vehicle may cause a great risk, and may thus be excluded from candidates. Here, as the distance between the pedestrian and the host vehicle according to time is continuously greater, the corresponding path may be determined as a safer path. In order to determine such a situation, a case that it is comprehensively determined that the distance between the two objects is long may be selected through a meaningful statistical method using the sum of the distances between the two objects at the respective points in time, and the average value, minimum value and median value of the distances between the two objects. As accuracy of the predicted paths increases, a probability of collision may be more accurately determined.

Figure 27:
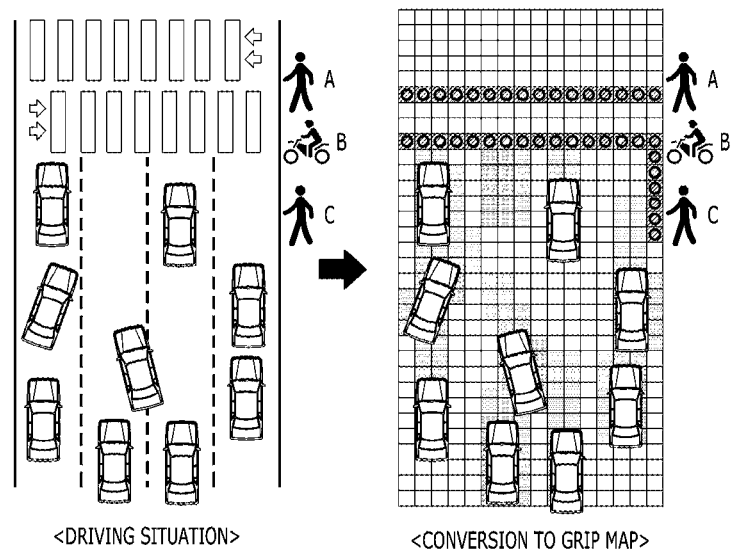
FIG. 27 is a view illustrating results of generation of predicted paths of pedestrians according to one embodiment of the present disclosure.

FIG. 27 is a view illustrating results of generation of predicted paths of pedestrians and a two-wheel vehicle at a crosswalk according to one embodiment of the present disclosure.

Referring to FIG. 27, the pedestrian A and the two-wheel vehicle B are located right in front of the crosswalk. The pedestrian C is located at a position deviating from the crosswalk. The heights of vehicles driving on a road may be displayed on a grid map depending on speeds and driving directions of the vehicles.

The pedestrian A and the two-wheel vehicle B are located right in front of the crosswalk, and thus, it is predicted that they will cross the road at the crosswalk.

The pedestrian C is located at the position deviating from the crosswalk, and thus, it is predicted that the pedestrian C will move towards the crosswalk and then cross the road at the crosswalk.

Figure 28:
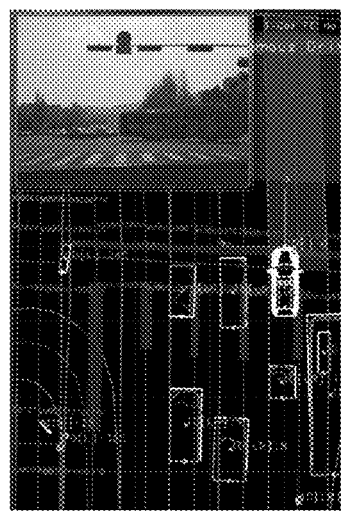
FIG. 28 is a view exemplarily illustrating a vehicle to which an autonomous driving apparatus according to one embodiment of the present disclosure is applied.
Figure 28:
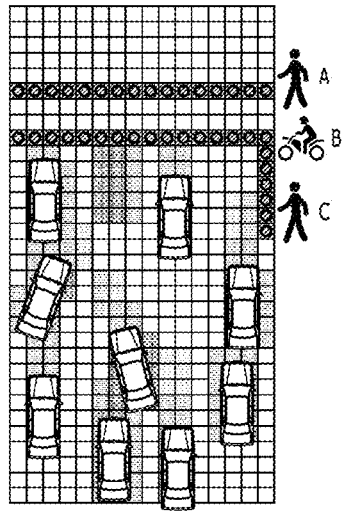

FIG. 28 is a view exemplarily illustrating a vehicle to which an autonomous driving apparatus according to one embodiment of the present disclosure is applied.

Referring to FIG. 28, a 3D roof lidar may be mounted on the vehicle to which the autonomous driving apparatus according to one embodiment of the present disclosure is applied, so as to improve recognition of peripheral objects.

In order to calculate the predicted path of a pedestrian, it is necessary to minimize occlusion of the peripheral objects. For example, if some objects are occluded due to blind spots, a gradient may be allocated to areas, in which the occluded objects are located, and thus the areas may be recognized as approachable areas, when the predicted path of the pedestrian is calculated. Therefore, cost function values of all paths passing by the corresponding areas or the vicinities thereof may be abnormally calculated. As a result, a path having a local minimum value may be calculated as having a global minimum value and, in this case, a path which an object must bypass may be set to a final path. Further, a global minimum value which does not actually exist may be set to final output and, in this case, an error in which a path along which the host vehicle is not capable of actually proceeding is set to a final path, may occur.

In order to reduce these errors, a 3D roof lidar may be mounted on the autonomous vehicle. When the 3D roof lidar is located at the comparatively high upper end of the roof of the vehicle, the 3D roof lidar may measure objects on a road without occlusion. A lidar signal from the 3D roof lidar may be fused with radar, camera and V2X information so that reliability of the lidar signal may be secured, and thereby, fused object information causing relatively little occlusion may be acquired.

Figure 29:
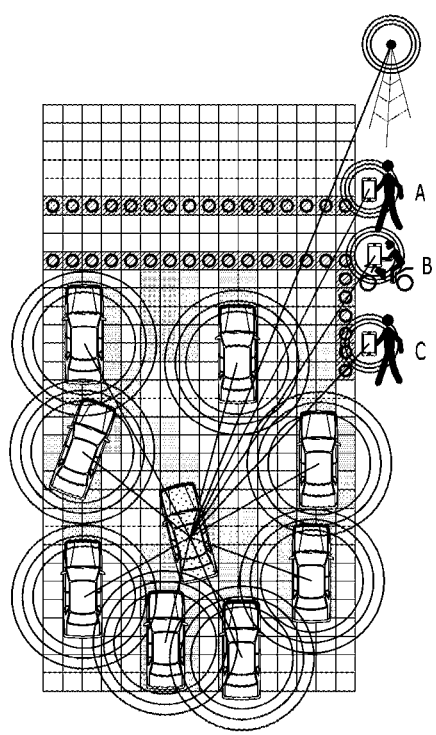
FIG. 29 is a view exemplarily illustrating an autonomous driving system to which the autonomous driving apparatus according to one embodiment of the present disclosure is applied.

FIG. 29 is a view exemplarily illustrating an autonomous driving system to which the autonomous driving apparatus according to one embodiment of the present disclosure is applied, and more concretely, exemplarily illustrating a system which transmits peripheral object or grid map information using V2X communication.

Infrastructure may transmit information (classification information, size and dynamic information, etc.) about a grid map (or other data structures) or peripheral objects (vehicles, pedestrians, structures, etc.) using V2I communication, and thereby, the autonomous driving system may finally calculate the predicted paths of pedestrians. When resources of the infrastructure are sufficient in use of V2I communication, the autonomous driving system may recognize a peripheral situation, may convert the recognized information into a grid map, and may then transmit the grid map to the peripheral vehicles. Otherwise, the autonomous driving system may transmit only peripheral object information to the peripheral vehicles, and then the respective vehicles may calculate a grid map in a distributed manner.

The autonomous vehicle may receive peripheral object information using V2V communication, and may finally calculate the predicted paths of pedestrians. If V2V communication is used, when the autonomous vehicle calculates the predicted paths of pedestrians, blind spots may be removed and reliability of data may be secured.

As described above, according to this embodiment of the present disclosure, considering that a pedestrian crosses a road in front of a decelerating vehicle or a stopped vehicle rather than an accelerating vehicle and occupies a space as there is no vehicle therebehind or as a vehicle therebehind is not accelerating, conditions under which the pedestrian crosses the road are modeled, moving paths of objects are predicted using height information about the objects, such as the pedestrian, and infrastructure other than the objects, thereby being capable of improving accuracy of the predicted path of the pedestrian crossing the road. Therefore, a risk of accidents may be reduced during autonomous driving, and stability of autonomous driving may be improved.

The apparatus and the method according to one exemplary embodiment of the present disclosure may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid-state drive (SSD), a silicon disk drive (SDD), a ROM, a RAM, a CD-ROM, a magnetic tape, a floppy disk, an optical data storage device, etc.

As is apparent from the above description, an apparatus and method for controlling autonomous driving of a vehicle according to at least one embodiment of the present disclosure may derive the predicted path of a pedestrian considering that the pedestrian crosses a road in front of a decelerating vehicle or stopped vehicle rather than an accelerating vehicle and occupies a space as there is no vehicle therebehind or as a vehicle therebehind is not accelerating, thereby being capable of improving accuracy of the predicted path of the pedestrian.

Further, the apparatus and method according to at least one embodiment of the present disclosure may be not only applied to movement of a single pedestrian but also expanded to a model on interaction between a pedestrian and a vehicle, and effectively derive the predicted path of the pedestrian not only in an area having a crosswalk but also in a jaywalking situation on a general road, thereby reducing a risk of accidents and improving stability of autonomous driving.

It will be apparent to those skilled in the art that various modifications and variations can be made in the present disclosure without departing from the spirit or scope of the disclosure. Thus, it is intended that the present disclosure cover the modifications and variations of the exemplary embodiment provided herein within the scope of the appended claims and their equivalents.

What is claimed is:

1. A method for controlling autonomous driving of a host vehicle, the method comprising:
   calculating first height information allocating a first gradient that descends in a proceeding direction of objects, comprising a vehicle and a pedestrian, from respective positions of the objects based on dynamic information of the objects;
   calculating second height information allocating a second gradient based on a probability that the pedestrian will occupy infrastructure other than the objects;
   calculating final height information by fusing the first height information and the second height information;
   generating a grid map by mapping the final height information;
   generating a predicted path of the pedestrian based on the grid map with the final height information mapped and modeling information of a crossing path and speed of the pedestrian;
   determining a driving strategy of the host vehicle based on a predicted path of the host vehicle and the predicted path of the pedestrian; and
   controlling the host vehicle with the determined driving strategy,
   wherein the generating a grid map comprises:
   dividing a road on a map into respective areas of the grid map; and
   mapping the final height information acquired by fusing the first height information and the second height information onto the respective areas of the grid map.

2. The method according to claim 1, wherein in the calculating first height information,
   different heights are provided depending on at least one of a type, a width, a height, or a length of the vehicle.

3. The method according to claim 1, wherein the calculating first height information comprises:
   calculating a length of a section having the first gradient based on the speed of the pedestrian and a time taken for the pedestrian to cross a road in front of the vehicle.

4. The method according to claim 1, wherein in the calculating second height information,
   when the infrastructure is a crosswalk and a crosswalk signal for the pedestrian is turned on, a height of an area occupied by the crosswalk is greatest among heights of adjacent areas.

5. The method according to claim 1, wherein in the calculating second height information,
   a height at one road side of a crosswalk, at which the pedestrian is located, is greatest among heights of adjacent areas and the height is gradually decreased in a direction towards a remaining road side of the crosswalk.

6. The method according to claim 1, wherein the generating a predicted path of the pedestrian comprises:
   converting the mapped final height information into a matrix and outputting the matrix.

7. The method according to claim 6, wherein the generating a predicted path of the pedestrian further comprises:
   generating the predicted path of the pedestrian by applying at least one of Gradient Descent or a Long Short-Term Memory (LSTM) to the matrix comprising the final height information.

8. The method according to claim 7, wherein, when the Gradient Descent is applied to the matrix comprising the final height information, the method further comprises:
   receiving the matrix comprising height information every time frame;

searching points having a greatest gradient in a negative direction from matrixes input from a starting position of the pedestrian;

generating at least one predicted path by connecting the searched points; and selecting a path configured to minimize time and space losses as a final predicted path of the pedestrian from among the at least one predicted path.

9. The method according to claim 7, wherein, when the LSTM is applied to the matrix comprising the final height information, the method further comprises:

generating a final predicted path of the pedestrian by receiving past continuous points comprising past positions of the pedestrian, dynamic information thereabout, peripheral object information and shape information, and continuously outputting future positions expected from the past continuous points.

10. The method according to claim 7, wherein the modeling information comprises:

a moving path and speed model of a pedestrian predicted to cross the road before the vehicle passes by;

a moving path and speed model of a pedestrian predicted to walk in a direction opposite to a moving direction of the vehicle and then to cross the road after the vehicle passes by; and a moving path and speed model of a pedestrian predicted to wait and then cross the road after the vehicle passed by.

11. The method according to claim 10, wherein the modeling information is modeled based on a time taken for the vehicle to pass by the pedestrian, a time for which the pedestrian is capable of waiting for the vehicle to pass by, and a time taken for the pedestrian to avoid a collision with the vehicle in consideration of a stopping distance of the vehicle at a front of the pedestrian.

12. The method according to claim 1, wherein the determining a driving strategy comprising:

confirming a probability of a collision by comparing the predicted path of the pedestrian to the predicted path of the host vehicle determined in a previous time frame;

searching paths of the host vehicle having no probability of the collision with the predicted path of the pedestrian; and determining a path having a lowest risk as the driving strategy from among the searched paths.

13. The method according to claim 12, wherein the determining a driving strategy further comprising:

determining the driving strategy based on at least one of a multi-path generation-based control method, a longitudinal acceleration and deceleration control method, a lateral deflection control method, or a lateral lane change control method, wherein the longitudinal acceleration and deceleration control method is executed such that, after random multiple paths are generated, natural paths configured not to collide with a position of the pedestrian according to time on the predicted pedestrian path are selected and then any one of the natural paths is determined, wherein the longitudinal acceleration and deceleration control method is executed such that a driving path determined in the previous time frame is maintained and a speed of the host vehicle is accelerated or decelerated in a longitudinal direction so that the host vehicle does not cross the pedestrian at a point in time when the host vehicle collides with the predicted path of the pedestrian, wherein the lateral deflection control method is executed such that an existing longitudinal speed profile is maintained and the host vehicle is deflected in a lateral direction opposite the pedestrian, and wherein the lateral lane change control method executed such that the existing longitudinal speed profile is maintained and the host vehicle changes lanes in the lateral direction opposite the pedestrian.

14. A non-transitory computer-readable recording medium storing a program for executing the method of claim 1.

15. An apparatus for controlling autonomous driving of a host vehicle, the apparatus comprising a processor which is configured to:

calculate first height information allocating a first gradient that descends in a proceeding direction of objects, comprising a vehicle and a pedestrian, from respective positions of the objects based on dynamic information of the objects;

calculate second height information allocating a second gradient based on a probability that the pedestrian will occupy infrastructure other than the objects;

calculate final height information by fusing the first height information and the second height information;

generate a grid map by mapping the final height information;

generate a predicted path of the pedestrian based on the grid map with the final height information mapped and modeling information of a crossing path and speed of the pedestrian;

determine a driving strategy of the host vehicle based on a predicted path of the host vehicle and the predicted path of the pedestrian; and control the host vehicle with the determined driving strategy, wherein the processor is further configured to:

divide a road on a map into respective areas of the grid map; and map the final height information acquired by fusing the first height information and the second height information onto the respective areas of the grid map.

16. The apparatus according to claim 15, wherein the processor converts the mapped height information into a matrix, and outputs the matrix.

17. The apparatus according to claim 16, wherein the processor generates the predicted path of the pedestrian by applying at least one of Gradient Descent or a Long Short-Term Memory (LSTM) to the matrix comprising the final height information.

18. The apparatus according to claim 15, wherein the modeling information comprises:

a moving path and speed model of a pedestrian predicted to cross the road before the vehicle passes by;

a moving path and speed model of a pedestrian predicted to walk in a direction opposite to a moving direction of the vehicle and then to cross the road after the vehicle passes by; and a moving path and speed model of a pedestrian predicted to wait and then cross the road after the vehicle passed by.

19. The apparatus according to claim 15, wherein the processor confirms a probability of a collision by comparing the predicted path of the pedestrian to the predicted path of the host vehicle determined in a previous time frame, searching paths of the host vehicle having no probability of the collision with the predicted path of the pedestrian, and determining a path having a lowest risk as the driving strategy from among the searched paths, wherein the processor determines the driving strategy based on at least one of a multi-path generation-based control method, a longitudinal acceleration and deceleration control method, a lateral deflection control method, or a lateral lane change control method, wherein the longitudinal acceleration and deceleration control method is executed such that, after random multiple paths are generated, natural paths configured not to collide with a position of the pedestrian according to time on the predicted pedestrian path are selected and then any one of the natural paths is determined, wherein the longitudinal acceleration and deceleration control method is executed such that a driving path determined in the previous time frame is maintained and a speed of the host vehicle is accelerated or decelerated in a longitudinal direction so that the host vehicle does not cross the pedestrian at a point in time when the host vehicle collides with the predicted path of the pedestrian, wherein the lateral deflection control method is executed such that an existing longitudinal speed profile is maintained and the host vehicle is deflected in a lateral direction opposite the pedestrian, and wherein the lateral lane change control method is executed such that the existing longitudinal speed profile is maintained and the host vehicle changes lanes in the lateral direction opposite the pedestrian.

* * * * *